United States Patent [19]

Champarnaud et al.

[11] Patent Number: 4,700,343
[45] Date of Patent: Oct. 13, 1987

[54] METHOD AND DEVICE FOR MODULE CONTENTION TO NON-DEDICATED COMMON LINE

[75] Inventors: Jean-Francois Champarnaud, Aix-en-Provence; Jackie Orange, Marseille, both of France

[73] Assignee: Minisystems, Aix-en-Provence, France

[21] Appl. No.: 779,773

[22] PCT Filed: Jan. 17, 1985

[86] PCT No.: PCT/FR85/00008
§ 371 Date: Nov. 15, 1985
§ 102(e) Date: Nov. 15, 1985

[87] PCT Pub. No.: WO85/03395
PCT Pub. Date: Aug. 1, 1985

[30] Foreign Application Priority Data

Jan. 19, 1984 [FR] France ................ 84 00937

[51] Int. Cl.$^4$ ............ H04J 3/02; H04M 11/04
[52] U.S. Cl. ............... 370/85; 340/825.51; 340/310 R
[58] Field of Search .......... 370/85, 940, 86, 89; 340/825.5, 825.51, 310 A, 310 R; 178/63 B

[56] References Cited

U.S. PATENT DOCUMENTS

| 4,209,840 | 6/1980 | Berardi et al. | 364/200 |
| 4,332,027 | 5/1982 | Malcolm et al. | 370/85 |
| 4,466,096 | 8/1984 | Heins et al. | 370/85 |
| 4,560,985 | 12/1985 | Strecker et al. | 370/85 |

FOREIGN PATENT DOCUMENTS 0094180  11/1983  European Pat. Off. ........... 370/85

OTHER PUBLICATIONS

Machine Design, vol. 55, No. 24, Oct. 1983; "Control Networks for the Home", pp. 109-112; Gutzwiller.

Primary Examiner—Douglas W. Olms
Assistant Examiner—Frank M. Scutch, III
Attorney, Agent, or Firm—Browdy and Neimark

[57] ABSTRACT

A network of at least two modules M1, M2 which are addressable and connected by a standard transmission line, for example an electric power distribution network RDE. The modules are connected either to sensors CAPT or actuators ACTI, or to a processor TERMI. An order number is assigned to the modules. The transmissions from the modules are sequenced by measuring the time elapsed between the messages. The messages are active signals having a predetermined duration, and all signals of shorter duration are suppressed. The impedance of the modules is low during emission and otherwise. Applications to the fields of personal computers and of domestic electric power distribution.

14 Claims, 26 Drawing Figures

CODL

IN INDICATOR TYPE OF MESSAGE
EM NUMBER OF EMITTER
DN NUMBER OF RECEIVER

METHOD AND DEVICE FOR MODULE CONTENTION TO NON-DEDICATED COMMON LINE

BACKGROUND OF THE INVENTION

The invention is generally concerned with digital data communication, remote control and remote measurement networks. The invention is particularly concerned with local networks for communicating packets of data using a carrier, more particularly networks dedicated to remote control and remote measurement functions.

In the context of the invention, the term local networks will be used for networks of this kind able to transfer data between any kind of addressable modules using at least one non-dedicated transmission line, these modules being adapted to serve as interfaces between actuators, sensors or central logic units and the aforementioned network, in order to implement said remote control and remote measurement functions.

In one embodiment a network of this kind is used for interchanging data between at least one central unit and any number of actuators, such as control relays, for example, or sensors, the central unit being connected to a so-called "communicator" module whereas the actuators or sensors are connected to so-called "satellite" modules.

In another embodiment, any number of networks as defined hereinabove are juxtaposed so that it is possible to implement in this way a network providing for communication between any number of central units and sensors or actuators.

In these embodiments the transmission network may be a network dedicated to data or a power transfer network such as the 220 V 50 Hz electrical mains supply or any form of power transmission network (12 V, 48 V, etc).

At the time of writing there exist two major families of local networks: local networks using a carrier and local networks not using any carrier.

Generally speaking, the problem to be overcome is that relating to possible conflict between information originating simultaneously from numerous modules. These conflicts are usually referred to as "collisions" of information. The man skilled in the art is well aware that as soon as there occurs simultaneous transmission of two streams of information addressed to the same receiver the latter has difficulty in recognizing the information from each of the transmitters in question. In practice this results in system blockages with all the easily imagined consequences in networks intended either for remote control or for remote measuring applications.

In practice, three types of network have been designed to overcome this problem.

In a first type of network, using carriers exclusively, a specific frequency is assigned to each module. The modules are activated only on receiving a signal at the frequency which has been assigned to them.

This type of network is limited by the fact that an assignable frequency band has to be divided into a number of groups of frequencies, the limitation occuring as a result of such division.

In a second type of network using either no carrier or a carrier at one frequency only, each module initially listens to establish whether there is another module transmitting.

This type of network is also limited, not only as to the number of stations that can be installed, but above all as to the number of stations that can transmit at a given time. This type of network is based on the principle that transmissions occur at random, in other words that during a given time interval the probability that any station or module will transmit is the same, although this is rarely the case is practice: in a remote control or remote measurement network, it is not rare for it to be always the same actuator or the same sensor which is used during a given time interval. During this time interval, there will therefore be a "preference" for this module which will send the longest packets. If two other modules are waiting during this time interval, there is a clear risk of these two modules transmitting at the same time as soon as the "preferred" module stops transmitting.

The third type of network uses no carrier or a carrier at a single frequency and is based on a method consisting in defining time intervals during which the stations or modules can transmit information.

This type of network is essentially limited in two ways. On the one hand, the speed of the network is reduced by virtue of its inherent design. When there are numerous time intervals assigned, there is necessarily a long waiting time for a station transmitting in a given time interval since it must wait for the predetermined time before transmitting.

On the other hand, this type of network has a centralized structure which is particularly limiting from the sequencing point of view. There is, in fact, a synchronization clock.

In certain implementations the clock is the frequency of the mains electrical power supply (50 Hz) which imposes the use for these local data communication networks of alternating current distribution networks.

SUMMARY OF THE INVENTION

One object of the present invention is to alleviate the disadvantages outlined hereinabove.

The present invention is directed in particular to a digital data transmission method in a network of the kind comprising at least two addressable modules connected by at least one non-dedicated transmission line, a method of the kind in which time is subdivided to define transmission time intervals and in which each module checks the absence of any signal on the line before transmitting and transmits only in the latter case, characterized in that there is assigned to each module at least one order number, there is assigned thereto at least one counter the content of which is representative of the number of the module authorized to transmit a message referred to hereinafter for convenience as "meaningful"; there are defined at least three time intervals of silence between messages, or time-delays, of increasing duration, respectively referred to hereinafter for convenience as the "meaningful message time-delay", "higher order candidature time-delay" and "lower order candidature time-delay", and characterized in that, the modules having a meaningful message to transmit being referred to hereinafter for convenience as "transmitter candidate" modules and a message sent by a transmitter candidate for which the order number does not immediately follow that of the module which has just transmitted being referred to hereinafter for convenience as a "candidature message", said time-delays of increasing duration are used to sequence transmission from modules as follows:
- the transmitter candidate authorized to transmit is allowed to transmit at the end of a time-delay corresponding to said meaningful message time-delay after the last signal present on the line;
- a candidature message is allowed to be transmitted from any transmitter candidate of higher order than that which has just transmitted at the end of a time-delay corresponding to said higher order candidature time-delay after the last signal present on the line;
- the counter of each module is incremented after each meaningful message and each candidature message transmitted after a higher order candidature time-delay;
- a candidature message is allowed to be transmitted from any transmitter candidate of lower order than that which has just transmitted after a lower order candidature time-delay from the last signal present on the line; and
- the counter of each module is reinitialized after a candidature message transmitted after a lower order candidature time-delay, so that the first order module is authorized to send a meaningful message.

Another object of the present invention is a network implementing the data transmission method as outlined hereinabove, and various modules usable to constitute a network in accordance with the present invention.

By virtue of these arrangements, and in particular the sequencing of transmissions from the modules by means of the time-delays between messages or signals, the present invention alleviates the disadvantages outlined hereinabove.

It should firstly be noted that there is no theoretical limit on the number of modules that can be connected to a network in accordance with the present invention. The non-dedicated transmission line may consist of any type of network, in particular a power transmission network of direct current or alternating current type or even a network dedicated to data transmission.

In the event that a power transmission network is used as a non-dedicated transmission line, the transmission method in accordance with the invention as then implemented is readily adaptable to the specific characteristics of the power distribution network concerned. In any event, the data transmission network in accordance with the present invention is independent of a clock frequency that has to be generated, for example, from the frequency of the power transmission network used.

Collisions between meaningful messages are totally avoided since the data transmission method in accordance with the present invention is of the kind in which each module checks for absence of any signal on the line before transmitting and only transmits in the latter case. Only a limited number of signals such as the candidature messages can be transmitted simultaneously in normal operation. Moreover, in the ranges provided for the transmission of these signals, the precise transmission time is, in accordance with another characteristic of the present invention, randomly determined, which further limits the risk of collision where there is any such risk.

A further object of the present invention is to achieve a high signal transmission rate and to render the network as immune as possible to disturbances on the non-dedicated transmission line, all the more so in that, in accordance with a preferred embodiment of the invention, said transmission line consists of a 110–220 V 50–60 Hz electrical power distribution network, a network of this kind being subject to notable disturbances.

Also, in accordance with one particularly advantageous embodiment of the invention, the transmission method, which is of the kind in which the messages are in part composed of so-called "active" pulses modulation a single frequency carrier for all the modules, so forming active signals, is specifically characterized in that, in combination:
- signals of duration less than a predetermined duration are eliminated during each time interval between active signals;
- an active signal duration is chosen which is substantially higher than said predetermined duration;
- logic states are encoded by varying the time interval between active signals.

In accordance with another characteristic of the invention in this aspect, in order to determine the time elapsed between consecutive active signals at the time of demodulation, the time elapsed between the trailing edges of said signals is measured. In this way it is possible to discriminate precisely between the logical states, for example the states "0" and "1".

The modules implementing this aspect of the invention are in particular characterized in that they comprise means for eliminating signals of duration less than a predetermined duration during the time interval between the active signals; means for generating active signals of duration significantly higher than said predetermined duration; means adapted to encode logic states by varying the time interval between active signals.

In accordance with a preferred embodiment, the modules further comprise means adapted to measure the time elapsed between the so-called "trailing" edges of the demodulated signals.

Another object of the present invention is to provide for simultaneously obtaining a network comprising any number of modules, this number varying, for example, between a few units and a few hundreds, and also optimizing the energy efficiency of the active signals.

In accordance with another advantageous characteristic of the method in accordance with the invention, the arrangement is such that the impedance of the modulator-line interface as measured from the line is resistive at the carrier frequency, that it is low during transmission of active signals and high when not transmitting.

The modules implementing this aspect of the invention comprise a modulator and are in particular characterized in that the modulator is connected to a line interface circuit comprising a series resonant circuit in series with a parallel resonant circuit both tuned to the carrier frequency and in that the modulator comprises means for generating an alternating signal at a frequency corresponding to the carrier frequency the impedance of which is low when an active signal is generated and high otherwise.

By virtue of these arrangements, the network in accordance with the invention can accommodate any number of modules and the connection of supplementary modules at any given location in the network does not entail any significant increase in the attenuation of active signals at this location.

The characteristics discussed above make it possible to achieve a digital data communication network which is particularly versatile in use and well suited to remote control and remote measurement functions.

Another aspect of the present invention is the application of a digital data transmission network such as that outlined hereinabove to the domestic sector and more particularly to the distribution of electrical power in a dwelling, a set of dwellings or a set of offices.

In accordance with this aspect of the present invention, by miniaturizing said addressable modules, by the use of integration, for example, it is possible to associate one with each device connected to an electrical network and controlled, in everyday life, by means of switches or contactors. These device may be, for example, lamps, electrically operated blinds, air conditioning units, etc.

Other addressable modules in accordance with the present invention then replace the actuators used such as the switches or contactors. The set of these elements is connected to the electrical power distribution network, while a central processor is also connected to the electrical power network.

The various lamps and other appliances are then controlled through the intermediary of said modules and the processor, the modules associated with these lamps and other elements being adapted to control a relay or a set of relays in turn controlling the switching of the lamps or domestic appliance in question.

This application provides for a considerably saving in implementing a domestic electrical power distribution network since, for example, two-way switching circuits and contactor connecting cables are done away with.

By virtue of this application of a network in accordance with the invention, it is actually possible to "replace" a conventional domestic network by a network "programmed" in the processor, it being understood that this network can be readily modified by the user modifying the processor program.

In this way there are achieved in the domestic electrical power distribution savings comparable with those which have been achieved in electronics on changing over from "hardwired" logic to "programmed" logic.

BRIEF DESCRIPTION OF THE DRAWINGS

The characteristics and advantages of the present invention will moreover emerge from the following description given with reference to the appended drawings in which:

FIG. 15 is a functional block schematic of a hardwired logic silence counter of the line coder-decoder;

DESCRIPTION OF PREFERRED EMBODIMENTS

Figure 1:
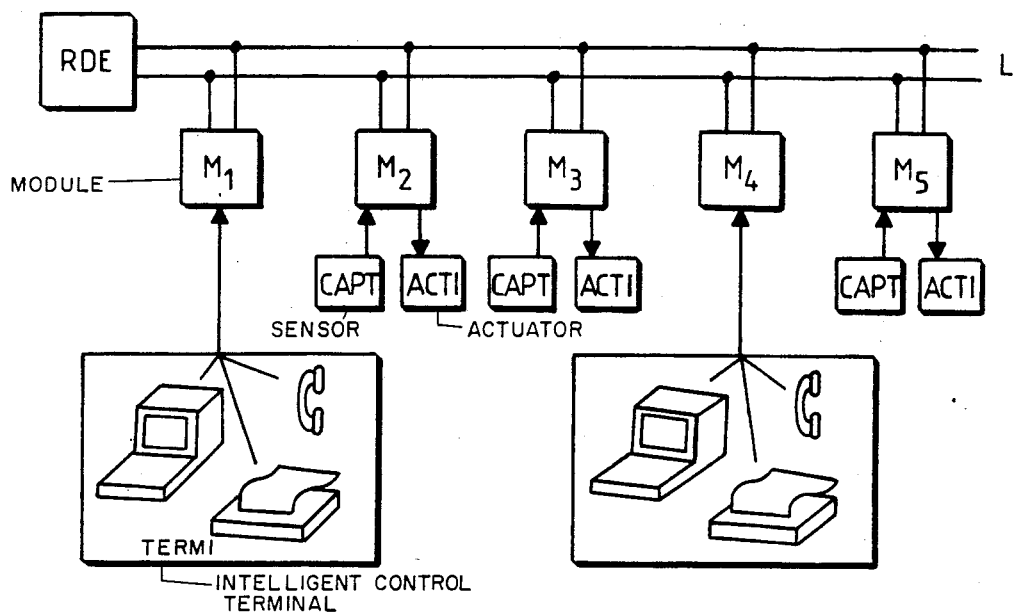
FIG. 1 is a general schematic view of a network in accordance with the present invention.
Figure 2:
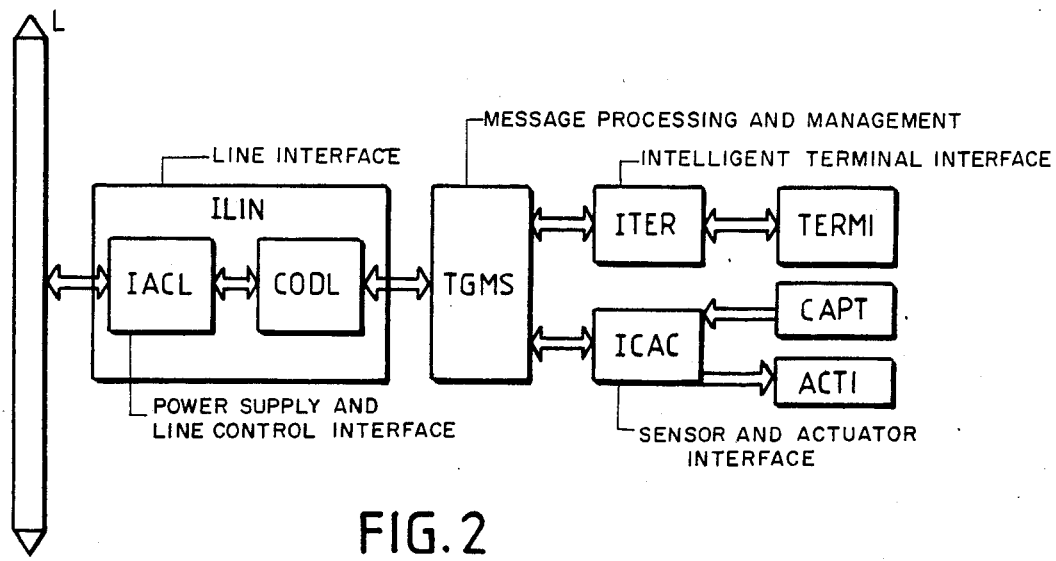
FIG. 2 is a schematic diagram of a module in accordance with the present invention.
Figure 3:
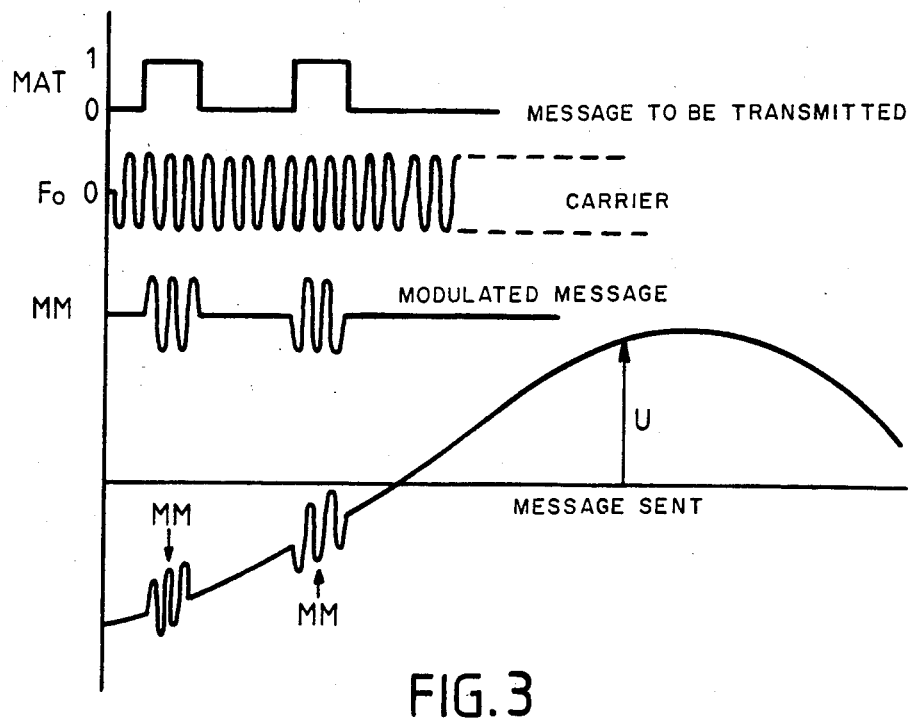
FIGS. 3 and 4 show a series of timing diagrams intended to illustrate the modulation-demodulation process in accordance with the present invention.
Figure 4:
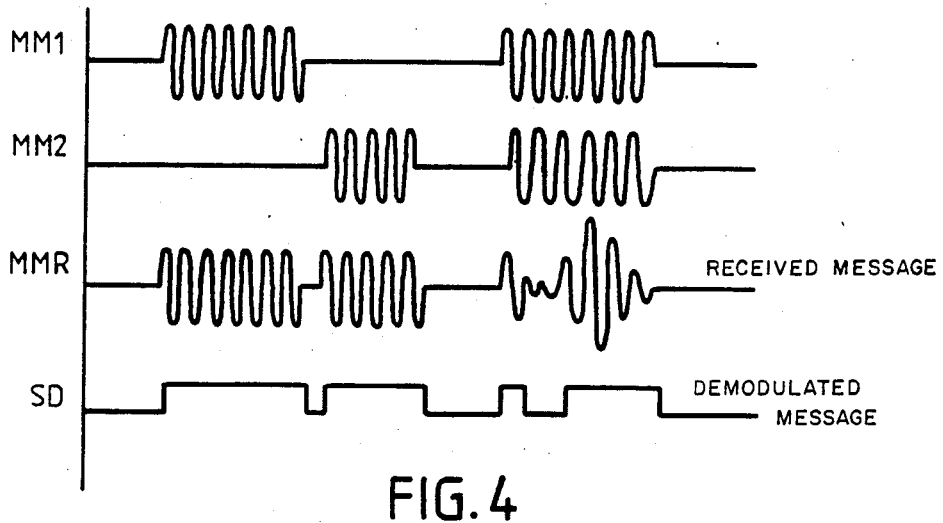
Figure 5:
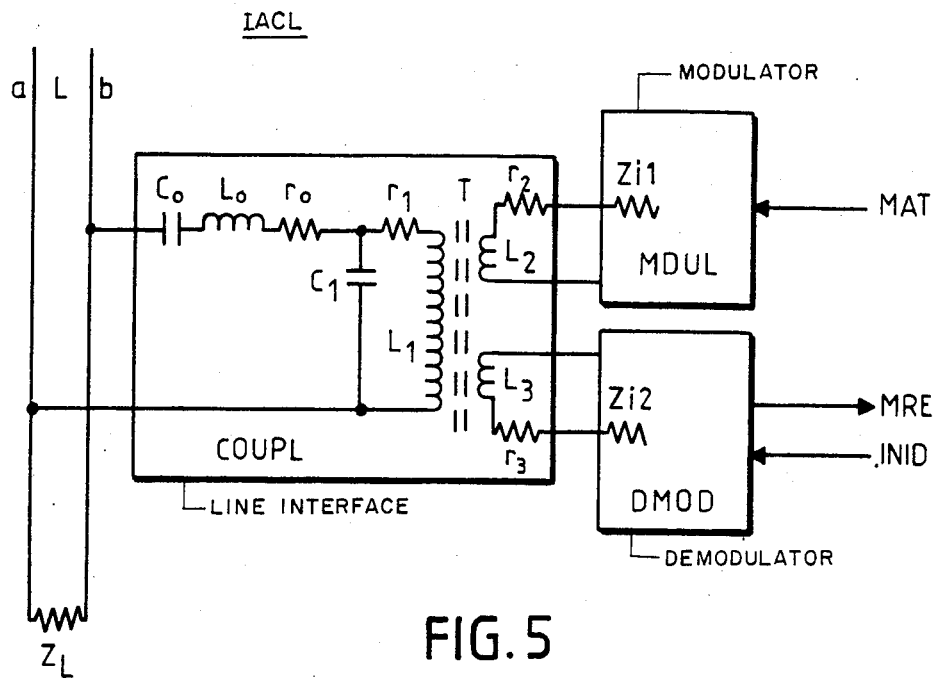
FIG. 5 is a schematic diagram of a power supply and line control interface of a module in accordance with the present invention.
Figure 6:
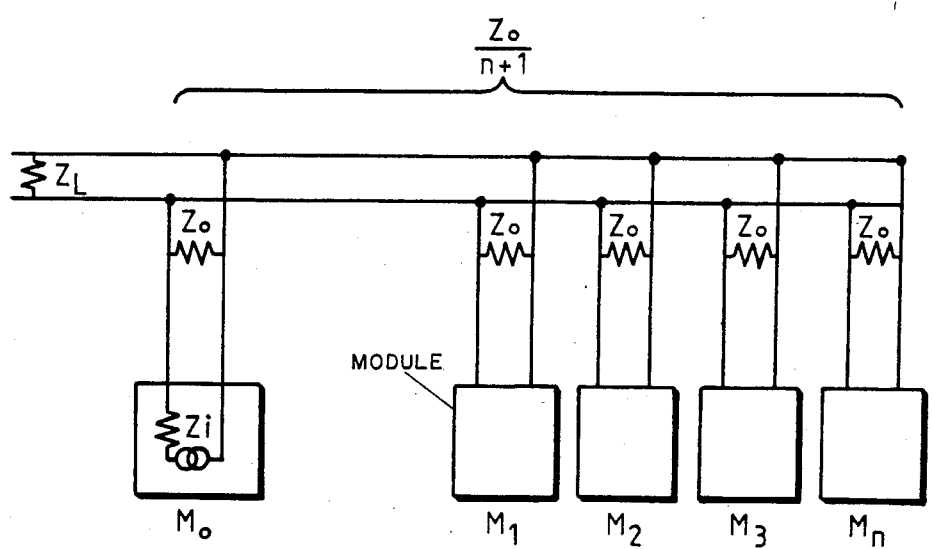
FIG. 6 is an explanatory schematic representing the line impedance and the impedance of the modules intended to explain one aspect of the modulation-demodulation process in accordance with the present invention.

There will now be described with reference to FIGS. 1 through 25 one embodiment of a network in accordance with the present invention. In this embodiment the addressable modules constituting the network are implemented using hardwired logic. It goes without saying that the teachings of this description may be used by the man skilled in the art to implement these modules in programmed logic, for example using a microprocessor such as a device from the MC 6800 family marketed by MOTOROLA.

The description of the selected embodiment shown in FIGS. 1 through 25 is divided into three parts:
general network features;
line signal modulation-demodulation;
signal coding-decoding.

GENERAL NETWORK FEATURES

Generally speaking, in the embodiment shown a network essentially comprises (FIG. 1):
power supply and transmission lines (L);
digital data transmission, remote control and remote measurement modules ($M_1$, $M_2$, ... $M_n$);
intelligent control terminals (TERMI);
actuators and sensors (ACTI and CAPT).

The power supply and transmission lines in this instance consist of the 115 or 220 V AC 50 or 60 Hz power distribution network RDE to which modules may be connected at any point and at any time in parallel: the network RDE is actually a non-dedicated transmission line. It goes without saying that in other embodiments (not shown) the power supply and transmission lines may consist of any appropriate network.

The transmission modules (FIG. 2) consist of all or some of the following five subsystems:
power supply and line control interface (IACL);
line transmission coding-decoding (CODL);
message processing and management (TGMS);
intelligent terminals interface (ITER);
sensor and actuator interface (ICAC).

The resources common to all the modules, which make it possible to achieve all the characteristics previously defined, constitute the line interface (ILIN) consisting of the IACL and CODL subsystems.

The following are defined:
communication modules COM consisting of subsystems IACL, CODL, TGMS and ITER;
satellite modules SAT consisting of subsystems IACL, CODL, TGMS and ICAC;
hybrid communication/satellite modules COM/SAT consisting of all five subsystems;
repeater tranformer modules REP consisting of two groups of IACL and CODL subsystems connected by TGMS subsystems which ensure transmission continuity between separate lines (two power distribution networks).

A communicator module COM in accordance with the invention is distinguished from a satellite module SAT in one way in that it possesses numbering means (thumbwheels, switches, straps, permanent or semi-permanent memory, for example) for assigning it a number m (COM m) whereas a satellite module SAT has numbering means for assigning it, in this embodiment, two numbers: its own number n on the one hand and, on the other hand, the number m of the communicator COM m with which it is associated: SAT n of COM No m (SAT n, m). A hybrid COM/SAT module is distinguished from a COM module only by the fact that it comprises a SAT of number zero that is directly connected to it. Each COM m and SAT n, m can only transmit at its own initiative at special times dependent on the line state and their numbers, COM m being able to send either to other COM m' (m≠≠m') or to each of the SAT n, m which are associated with it by virtue of their common number m, whereas SAT n, m can transmit only to the associated COM m. SAT n, m transmits normally only if it has previously received a common naming it from its associated COM m, imposing transmission conditions on it; SAT n, m may, however, in very special cases and at a slower rate, transmit at its own initiative in the absence of any instructions from its associated COM n, either to identify itself if it has not been initialized or to facilitate troubleshooting in the event of degraded operation.

The interface IACL is made up of resources with the following transmission functions:
on transmission, in response to a command from CODL (succession of 5 V and 0 V levels of defined durations) IACL sends over the line, during the presence of the 5 V level, a periodic signal centered on a carrier frequency (in this instance: 90 kHz±5 kHz).

Also, if the interface IACL detects the presence of the operating frequency (in this example 90±5 kHz) and in the event of an energy level threshold E and a duration threshold T being exceeded at this frequency, it indicates to CODL the presence of the signal (5 V level) or absence of the signal (0 V level). Because of the detection criteria that apply, IACL carries out a consistency check at the first level. CODL is made up of resources whose functions are as follows:
signal reception control and decoding; measurement of time-delays without signals (number of silences), detection of starts of messages, decoding of elementary bits, second level consistency check, reception speed calculation, calculation of a transmission speed common to all the networks;
transmission control and coding: calculation of random start of transmission time-delay, structuring and transmission of elementary bits, collision control.

SIGNAL MODULATION-DEMODULATION

Description of power supply and line control interface (IACL)

The transmission mode used in this example entails the use of a carrier at a frequency situated in the authorized frequency band from 10 to 150 kHz. In this case this frequency is chosen such that $F_0=90$ kHz. At lower frequencies distribution networks are subject to high-level disturbances produced by equipment (thyristors, televisions, switching mode power supplies) the fundamental frequency of which extends from 100 Hz to 20 kHz approximately, the spectrum of which is rich in harmonics, however. At higher frequencies the attenuation due to the lines is high and calls for high transmission powers. The carrier frequency $F_0$ (FIG. 3) is 100% amplitude modulated by the messages to transmit MAT which produces the modulated message MM which is superimposed on the power distribution network voltage U. With the transmission speeds used in this example, the maximum fundamental frequency is in the order of 1,500 Hz. Correct transmission, with the integrity of a substantially rectangular waveform observed, is obtained by preserving the third harmonic of this frequency, or 4,500 Hz. The bandwidth required is therefore 9 kHz. On a highly disturbed line the narrow bandwidth imposed by amplitude modulation is favorable to improving the signal-to-noise ratio. The choice of amplitude modulation simplifies the detection of any collision between two transmissions MM 1 and MM 2 (FIG. 4) since there is obtained pure and simple addition of the amplitudes at the level of the received message (MMR) yielding a demodulated signal (SD) the timing diagram of which is abnormal. CODL does not recognize the message and eliminates it. In the event that it receives a message, if CODL were transmitting one of the messages MM1 or MM2 causing the collision in this way, it would cease to transmit at its own initiative.

The interface IACL (FIG. 5) comprises the following three subsystems:
line interface (COUPL);
modulator (MDUL);
demodulator (DMOD).

The line interface (COUPL) is connected on the one hand to the line and on the other hand to the modulator which supplies it with the messages to transmit (MME) and to the demodulator (DMOD) to which it supplies the modulated messages received (MMR). The modulator (MDUL) is connected to CODL which supplies it with the messages to transmit (MAT). The demodulator is connected to CODL to which it supplies the messages received (MRE) and from which it receives inhibiting commands (INID).

Generally speaking, in accordance with the invention the arrangements are such that the impedance as measured from the line L of the modulator MDUL-line L interface IACL is resistive at the carrier frequency $F_0$, low during transmission of the active signals SA and high when not transmitting.

The line interface COUPL (FIG. 5) is, in the embodiment shown and according to this aspect of the invention, made up as follows: the main component of the line interface is a transformer T having three close-coupled windings which totally isolates the line electrically from the modulator and the demodulator. The primary winding, consisting of the coil $L_1$ with internal resistance $r_1$, is tuned to the carrier frequency $F_0$ by a capacitor $C_1$. The resulting oscillatory circuit $L_1C_1$ is connected to the line via a coil $L_0$ of internal resistance $r_0$ in series with a capacitor $C_0$. The oscillatory circuit $L_0C_0$ is tuned to the frequency $F_0$ (in this instance $F_0=90$ kHz). The capacitor $C_0$ blocks the DC or low-frequency (50 or 60 Hz) component on the line where the latter constitutes a power distribution network.

The coil $L_0$ compensates for the capacitive reactance of the capacitor $C_0$ and forms with the capacitor $C_0$ a bandpass filter centered on the frequency $F_0$. The components $L_0$, $C_0$, $L_1$, $C_1$ are chosen so that at the frequency $F_0$ the impedance $Z_0$ of the interface COUPL as seen from the line L is of the following form (second order approximation):

$$Z_0 = r_0 + \frac{L_1}{r_1 C_1}$$

the reactance of $L_0$ compensating for the capacitance of $C_0$ at frequency $F_0$.

The impedance of the circuit $L_0$, $C_0$ is thus virtually zero whereas that of the circuit $L_1C_1$ is very high.

Thus in practice the impedance $Z_0$ is close to that of the circuit $L_1C_1$.

Because of this, the impedance $Z_0$ is purely resistive and of high value, reducing the line current to the minimum and likewise minimizing voltage drops along the line. When a module $M_0$ (FIG. 6) transmits over the line to "n" modules ($M_1$, $M_2$, $M_3$, ... $M_n$) the impedances of which as seen from the line are $Z_0$, the transmitting module is loaded by an overall impedance $Z_1$ such that:

$$Z_1 = \frac{\frac{Z_0}{n+1} \times Z_L}{\frac{Z_0}{n+1} + Z_L}$$

in which $Z_0$ is the impedance of a module, "n" is the number of modules and $Z_L$ is the impedance of the line. If Zi is the internal impedance of the modulator (MDUL) of the transmitting module, the attenuation of the carrier signal is of the form:

$$G = \frac{Z_1}{Z_i + Z_1}$$

As the attenuation G must be minimal, the modulator is designed to have a low impedance Zi and a high impedance $Z_0$ so that the impedance $Z_1$ is as high as possible.

The modulator MDUL (FIG. 5) implements the following functions:
mixing the signal to transmit and the carrier;
low-impedance line control during transmission;
changeover to high impedance when not transmitting so as not to load the line.

Figure 7:
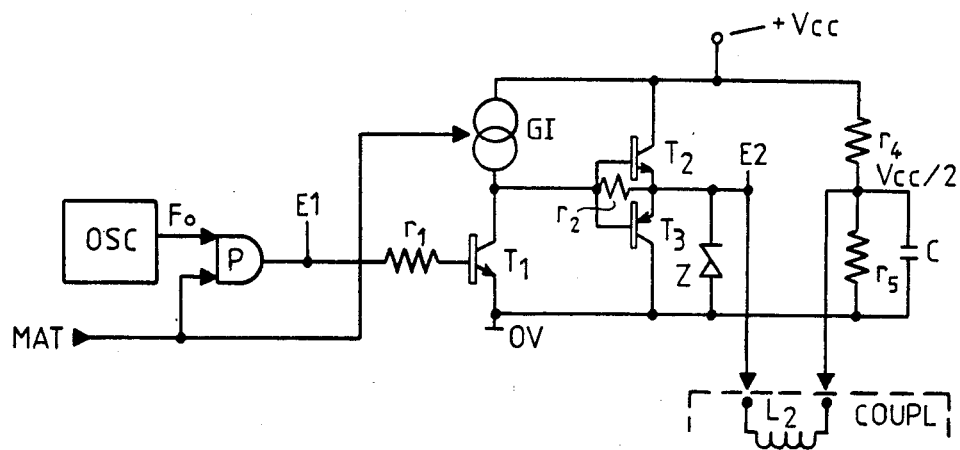
FIG. 7 is a schematic diagram of the modulator.
Figure 8:
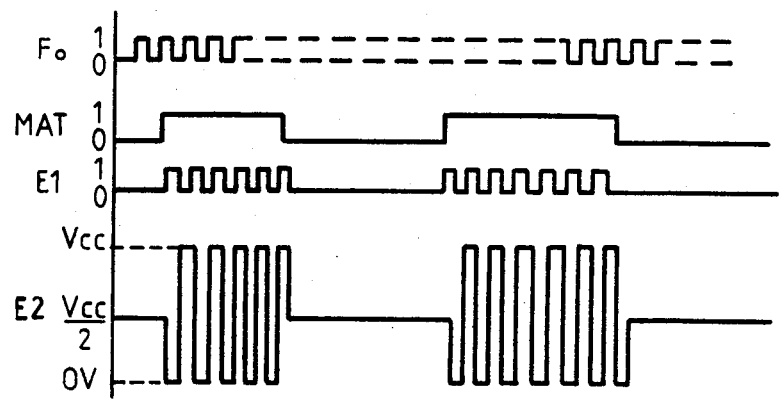
FIG. 8 is a phase diagram for the modulator.
Figure 9:
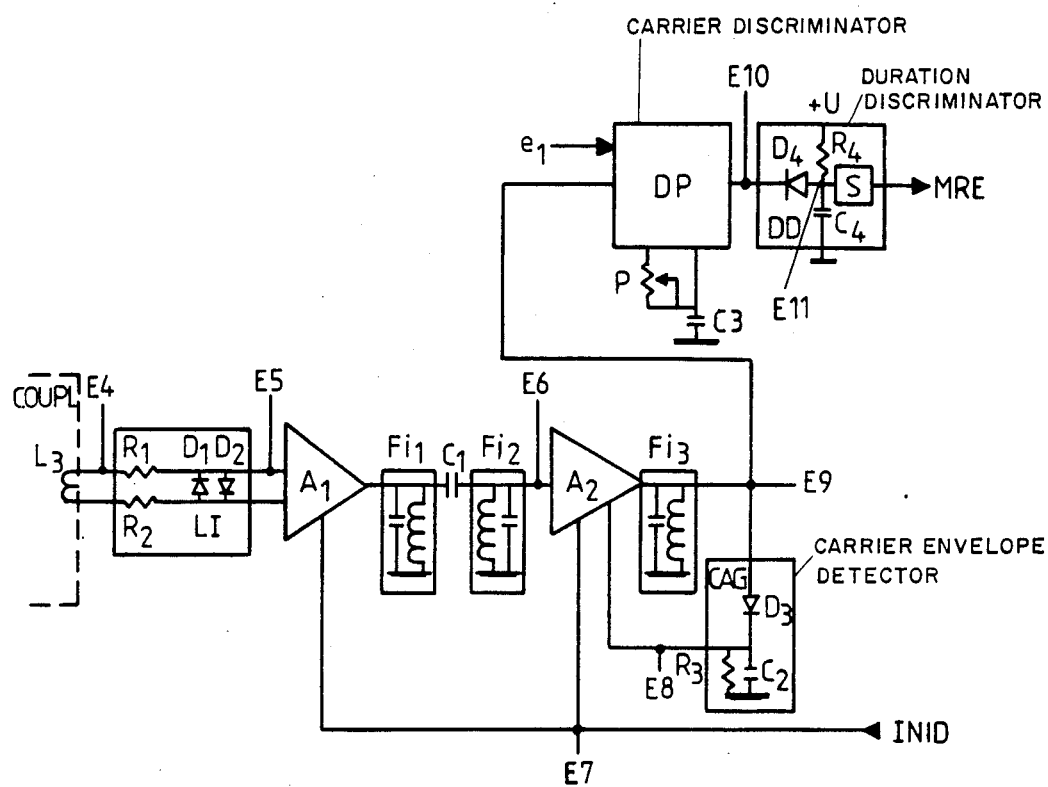
FIG. 9 is a schematic diagram of the demodulator.

FIG. 7 is a schematic diagram of the modulator and FIG. 8 its phase diagram.

The carrier frequency ($F_0$) from an oscillator (OSC) is modulated by the message to transmit (MAT) by means of a logic gate P which implements the AND function yielding the signal E1. The gate P controls a transistor $T_1$ the collector of which is loaded by a current source GI activated by the data signal.

The common collector transistors $T_2$ and $T_3$ set the line coil $L_2$ of the interface (COUPL) to low impedance. The other end of the coil $L_2$ is connected to a voltage divider consisting of the resistors $r_4$ and $r_5$ decoupled by a capacitor C. As the supply potential is Vcc, the average potential of the coil is Vcc/2. Modulation yields a squarewave signal (E2) on the coil oscillating between:

$$V_{cc} - Vcc/2 = Vcc/2 \text{ and } 0 - Vcc/2 = -Vcc/2$$

When the message to transmit signal goes to 0 V, the transistor $T_1$ and the current source GI are cut off. The resistor $r_2$ imposes a potential at the bases of $T_2$ and $T_3$ such that $T_2$ and $T_3$ are cut off. The output impedance of the modulator thus becomes very high and the line is not loaded, immediately transmission stops.

Any messages received from another transmitter produce a signal across $L_2$. Given the presence of the voltage divider, the signal oscillates between +Vcc and 0 V at maximum, avoiding any conduction in $T_2$ or $T_3$ which would excite the line. The zener diode Z protects the stage $T_2$, $T_3$ from disturbances on the network.

It will be noted that the set of the three transistors $T_1$, $T_2$, $T_3$, the current source GI and the oscillator OSC constitutes a specific embodiment of means for generating an alternating current signal at frequency $F_0$ the impedance of which is low when a signal is generated and high otherwise.

The demodulator (DMOD) (FIG. 9) implements the following functions:
amplitude limitation (LI);
amplification and filtering ($A_1$, $A_2$, $Fi_1$, $Fi_2$, $Fi_3$);
receive interlock ($A_1$ and $A_2$);
signal level regulation ($A_2$ and CAG);
carrier discrimination (DP);
duration discrimination (DD).

Figure 11:
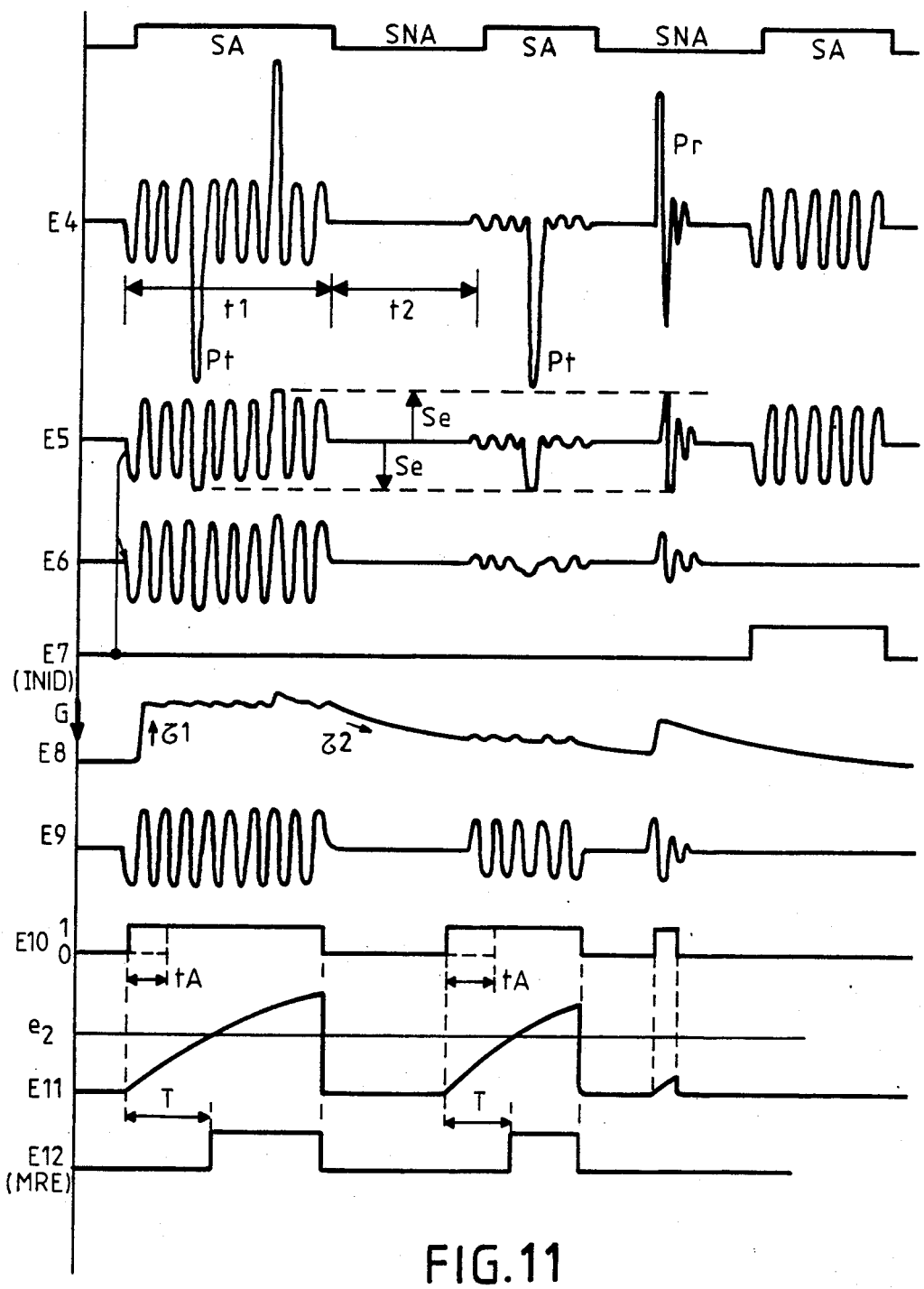
FIG. 11 is a phase diagram for the same demodulator.
Figure 12:
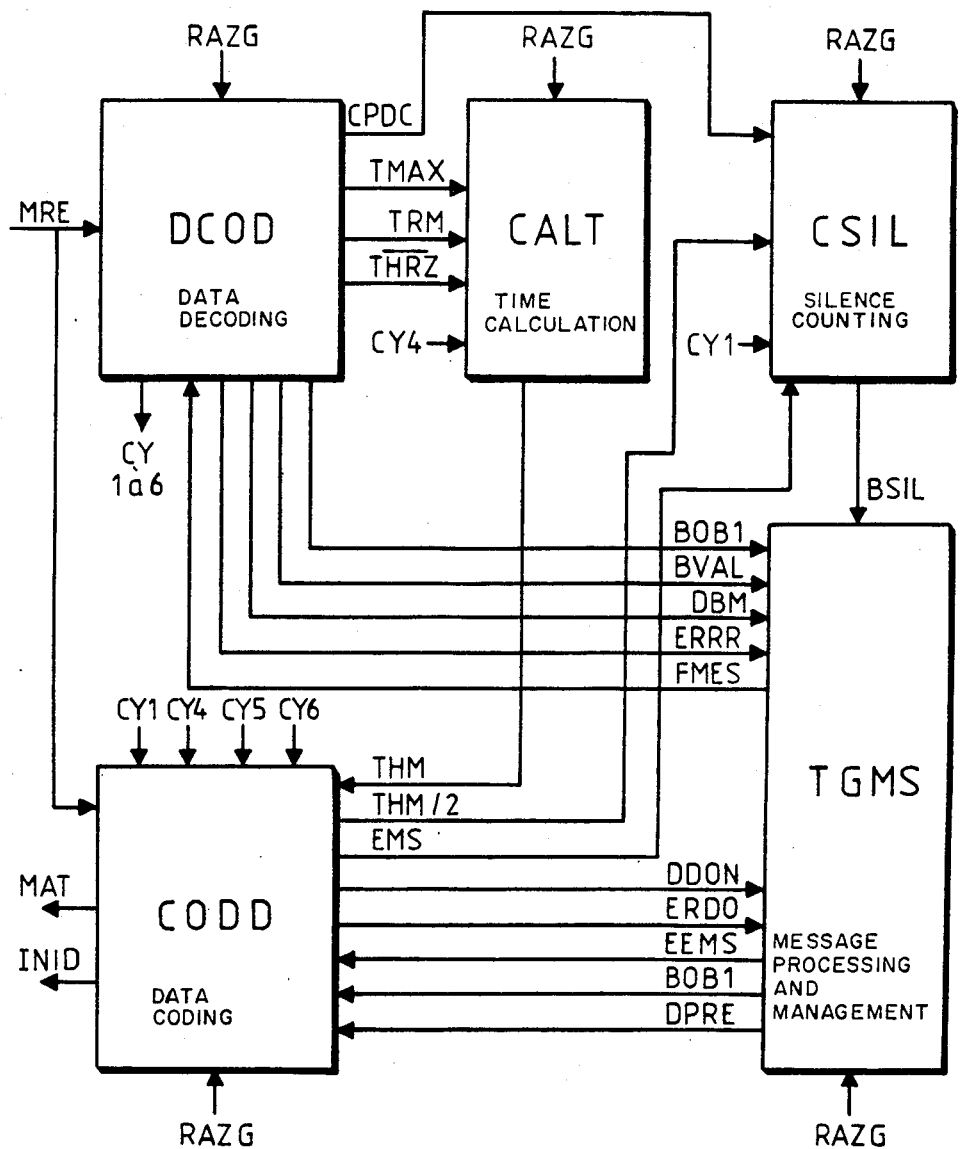
FIG. 12 is a schematic diagram showing the functions of a line coder-decoder of a module in accordance with the present invention.

FIG. 11 shows the phase diagram.

Amplitude limitation: the objective is to protect the input amplifier $A_1$ against disturbances ($P_t$) on the line. Two diodes $D_1$ and $D_2$ connected head-to-head conduct when the signal (E4) reaches the threshold (Se) of 0.7 $V_{peak}$. The resistors $R_1$ and $R_2$ limit the peak limiting current.

Figure 10:
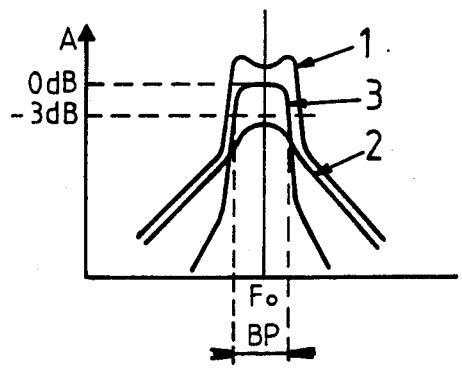
FIG. 10 is a frequency diagram illustrating certain characteristics of the demodulator.

Amplification and filtering: the amplifier $A_1$ preamplifies the signal (E5) and drives two bandpass filters $Fi_1$ and $Fi_2$ coupled by the capacitor $C_1$, the coupling being slightly closer than the critical coupling yielding the passband "1" (FIG. 10). The signal (E6) is then partially filtered and the disturbances attenuated. The signal (E6) is amplified by the amplifier $A_2$ associated with the band filter $Fi_3$ the passband "2" of which (FIG. 10) associated with the passband "1" (FIG. 10) yields the passband "3" (FIG. 10) and the bandwidth BP (FIG. 10) of the demodulator.

Receive interlock: when the modulator (MODUL) is in transmit mode under the orders of CODL, the latter commands the demodulator inhibiting signal INID (E7). The amplifiers $A_1$ and $A_2$ are disabled (zero gain) to avoid self-reception of the high-level signal from the modulator. In this case the filters $Fi_1$, $Fi_2$, $Fi_3$ do not store any energy and when the modulator stops transmitting the demodulator retains its maximum sensitivity for detecting transmissions from other modules.

Level regulation: an automatic gain control circuit (CAG) detects the carrier envelope by means of a circuit comprising the diode $D_3$, the resistor $R_3$ and the capacitor $C_2$ the time constant of which is $\tau_1$ when the signal is turned on and $\tau_2$ when the signal is turned off with $\tau_2 > \tau_1$. The envelope signal ($E_8$) is applied to the gain control input of the amplifier $A_2$ so that when the amplitude of the envelope signal ($E_8$) increases the gain of $A_2$ increases. The result is amplitude compression such that the dynamic range of the signal ($E_9$) is reduced. In the present application a variation of 30 dB at line level (a near transmitter and a distant transmitter) causes a variation of 6 dB at the output of amplifier $A_2$ ($E_9$). The time constant $\tau_2$ give rise to a gain reduction in the interval separating the bursts and therefore enhanced immunity to disturbances on the network during a message. The blocking command (INID) prevents saturation of the AGC stage in order to benefit from the maximum sensitivity of the demodulator after a transmission from its associated modulator.

Carrier discrimination (DP): a tone decoder compares the phase of the received signal ($E_9$) with the phase of an internal oscillator the frequency of which is slaved to the incoming signal ($E_9$), provided that its level is above a threshold "$e_1$". In the rest condition the internal oscillator is locked to the frequency $F_0$ by a potentiometer P and a capacitor $C_3$. When the signal is at a frequency $F_0 \pm \Delta F$, the tone decoder supplies a "carrier present" signal ($E_{10}$) used to demodulate the message. The time taken for the oscillator to synchronize its phase with the signal ($E_9$) is indeterminate and yields an uncertainty TA (FIG. 11).

Duration discriminator (DD): when a disturbance occurs on the line, such as a short-duration, wideband switching transient, the carrier discriminator can detect the signal in the band BP around $F_0$, but the phenomenon is of short duration.

The principle employed to circumvent this phenomenon consists in verifying presence of the signal during a predetermined minimum interruption-free duration T.

Generally speaking, in accordance with one particularly advantageous characteristic of the invention, in order to achieve a high transmission speed combined with good immunity to disturbances (FIG. 11):

signals $P_t$ of duration less than a predetermined duration T during each time interval $t_2$ between active signal SA are eliminated;

a duration t of the active signal SA is chosen substantially higher than said predetermined duration T;

the logic states are encoded by varying the time interval $t_2$ between active signals SA.

In the specific embodiment shown, an integrator circuit comprises a resistor $R_4$, a capacitor $C_4$ and a diode $D_4$. The capacitor charges normally to a voltage U. When there is no signal at the output of the frequency discriminator DP, there is no signal from the integrator ($E_{11}$). Otherwise the capacitor charges during the duration of signal $E_{10}$.

A threshold detector S changes state when the signal $E_{11}$ exceeds a threshold "$e_2$" at the end of a time T. The output of the threshold detector constitutes the received message MRE. This configuration imposes on the active signal SA (FIG. 11) a duration at least equal to T (FIG. 11). The disturbing signal $P_t$ of duration less than T is eliminated.

By virtue of these arrangements:

the highest transmission speed for a filtering duration T is obtained by choosing to encode the information in such a way that the duration $t_1$ (FIG. 11) of the active signal is constant and slightly greater than T. Thus, in accordance with one characteristic of the invention to be described hereinafter, the encoding of a state "0" or "1" may be effected by varying the non-active signal SNA (FIG. 11) of duration $t_2$ and consisting of the silence between two active signals;

the leading edge of the signal MRE ($E_{12}$) appears at a time $T + tA$ from the beginning of the signal SA ($E_4$) in which T may be subject to drift and $t_A$ is random as already seen, whereas the trailing edge of the signal MRE is delayed relative to the trailing of SA only by a short time due to the de-excitation of the line.

In accordance with one characteristic of the invention, in order to determine the time elapsed between consecutive active signals SA, for the purpose of decoding the logic states, the time elapsed between the trailing edges of consecutive signals MRE is measured.

The decoding process, which is another characteristic feature of the invention, is explained in the section below on "signal coding-decoding".

A signal is recognized as a usable signal only if it meets the following conditions:

frequency between $F_0 - BP/2$ and $F_0 + BP/2$;

power level above threshold "$e_1$" of the carrier discriminator for a time at least equal to T.

The combination of the criteria indicated hereinabove confers on IACL a high immunity to disturbances on the line thus constituting a first consistency check on the information, CODL effecting other checks subsequently.

SIGNAL CODING-DECODING

Description of line coding and decoding function (CODL)

The line coding-decoding function CODL comprises four elementary functions (FIG. 12):

data decoding: DCOD
time calculation: CALT
data coding: CODD
silence (or silence time) counting: CSIL.

Before the above four functions are described, the principal signals used in this example illustrating one specific embodiment of the invention, implemented by means of a network in accordance with the invention, will now be briefly described.

Figure 13:
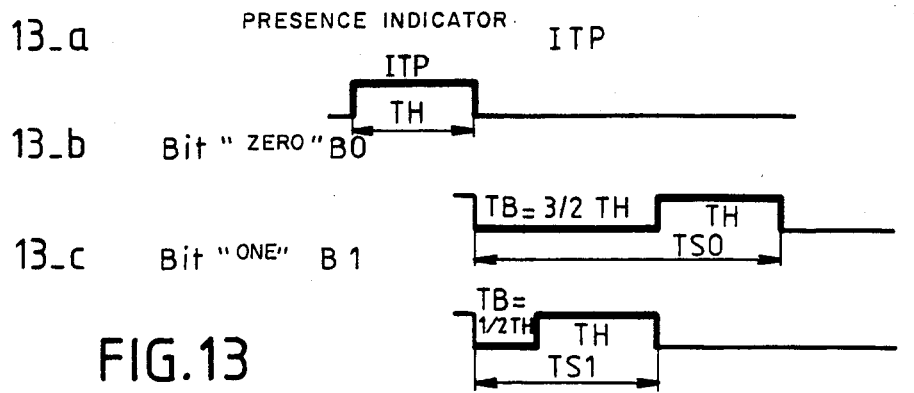
FIG. 13 shows the basic signals used in the present embodiment of a network in accordance with the present invention.
Figure 14:
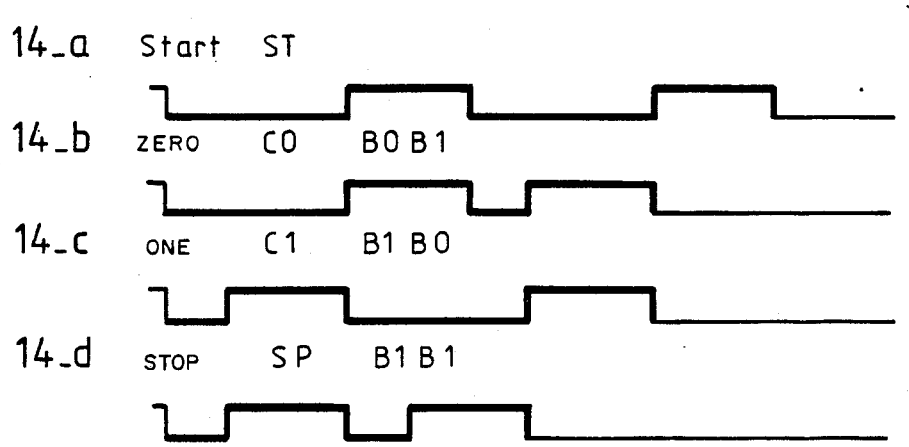
FIG. 14 shows composite signals used in this network and obtained from the base signals shown in FIG. 13.
Figure 15:
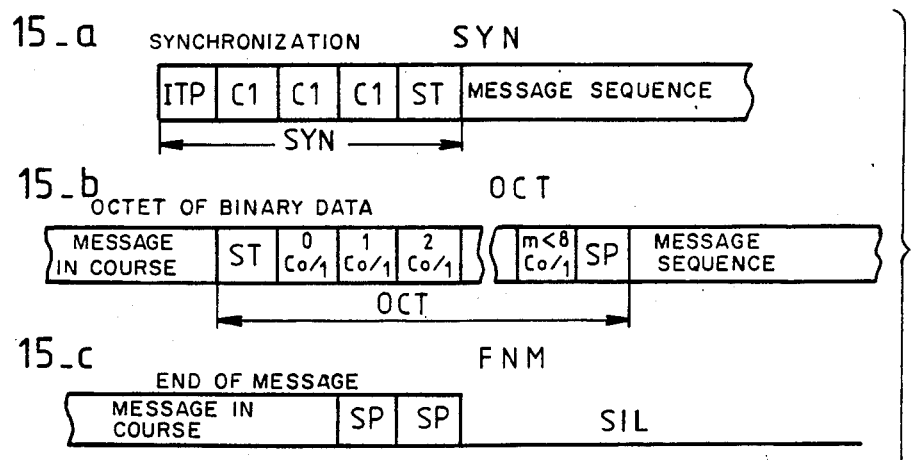
FIG. 15 show a number of message elements transmitted by the modules in accordance with the present invention.

The basic signals (FIG. 13) constitute the content of the messages. They are made up of the absence of signal during a time TB (no carrier frequency on line) then the presence of signal during a time TH (carrier frequency on line). These sequences represent: an basic "0" (B0) if TB = 3/2 TH, neglecting tolerances (FIG. 13b); an basic "1" (B1) if TB = ½ TH, ignoring tolerances (FIG. 13c). Messages always begin with a presence indicator ITP (FIG. 13a) consisting of the presence of signal for a time TH. The various combinations of the basic signals constitute the composite signals (bits) (FIG. 14):

a composite "0" C0 is made up of B0 followed by B1 (FIG. 14-b);

a composite "1" (C1) is made up of B1 followed by B0 (FIG. 14-c). The usable information is thus repeated twice, this redundancy providing for a higher level consistency check on the data.

Two other composite signal are generated or recognized.

a "START" (ST) made up of two successive B0 (FIG. 14-a);

a "STOP" (SP) made up of two successive B1 (FIG. 14-d). These latter two composite bits are used for sequencing transmissions. A transmission is an uninterrupted succession of composite bits associated with the same transmitter.

As compared with the so-called "service" signals or messages which are concerned with the internal working of the network, there are so-called "meaningful" messages comprising data to be processed and interpreted externally of the network.

Figure 16:
FIG. 16 show types of messages sent by these modules.
Figure 16:
Figure 16:
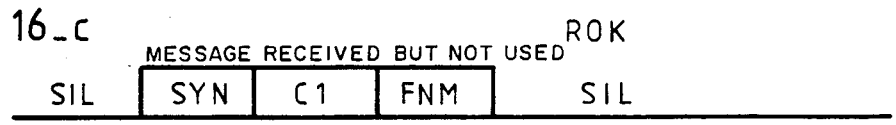
Figure 16:
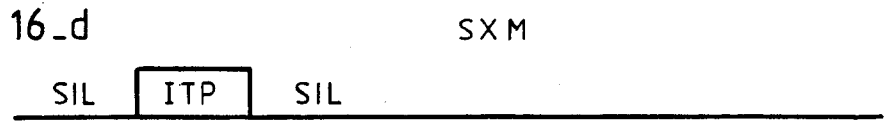

A meaningful message transmission comprises a start of transmission SYN (FIG. 15a) made up of an ITP followed by at least three C1, followed by an ST. This combination uniquely characterizes a start of transmission SYN; it provides for:

beginning from ITP, detecting a start of transmission;
  re-aligning a receiver uniquely, even in the middle of an SYN immediately on the arrival of the ST at the end of the SYN (simultaneous transmission by two transmitters or interference in the start of transmission);
  detecting simultaneous disturbances or transmissions, more particularly during the TB of B0 and of ST, for which the periods of silence are the longest;
  detecting simultaneous transmissions from transmitters having different transmission speeds, by virtue of the high number of C1 and the resulting offset;
  initializing measurement of the average transmission rate over all the length of SYN;
  SYN may be followed by binary digital data messages (MOC) (FIG. 16).

Each byte OCT may be of any length, beginning with ST and ending with SP (FIG. 15-b), and made up of C0 and C1. This structure, conforming to the standard serial transmission formats, in regard to the bytes (8 bits), facilitates interchanges with external units.

A transmission may be made up of a number of successive bytes the position of which within the transmission indicates a specific precise meaning (see FIG. 17 explained later).

The end of a transmission FNM is indicated by the combination SP-SP (FIG. 15-c) which follows the SP of the last byte transmitted. This combination uniquely characterizes an FNM and enables any interference-free receiver to recognize it.

Two other types of message constitute service indicators;

SOK (FIG. 16-b), made up of SYN, C0, FNM, is a reception acknowledgement from a destination module indicating that the meaningful data transmitted has been correctly received and used;
  ROK (FIG. 16-c), made up of SYN, C1, FNM, is a reception acknowledgement from a destination module indicating that the meaningful data transmitted has been correctly received but that it has not been used.

The structure of these two indicators is such that, in the event of abnormal simultaneous transmission (two receivers having the same number, for example), the transmitter that transmits SOK first detects the collision and ceases to transmit, enabling the transmission of ROK to continue. The B0 of the C0 of SOK actually comprises a first period of silence longer than that of the B1 of C1 of ROK, which creates a de facto priority for the indicator ROK.

A last signal SXM (FIG. 16-d) effected by transmitting a single ITP constitutes a presence indicator to establish with the transmission of other messages the sequence of priorities of the various transmitter candidates, so avoiding collision of meaningful messages. In the context of the present invention, the modules having a meaningful message to transmit (in this case SAT or COM) are called "transmitter candidate" modules. The signal SXM is called, for convenience, the "candidature message". This signal is the only one that can be transmitted simultaneously by more than one transmitter candidate or disturbed by interference without its implicit content being modified.

This signal is essential to correct functioning of IACL and CODL, establishing a sequence of inter-transmission areas and conferring on them, in accordance with one characteristic of the present invention, an implicit meaning for all receivers. The duration of these inter-transmission areas (silence SIL) determines the transmission ranges of each transmitter candidate.

Before describing in detail the sequencing of transmissions in the embodiment of the network chosen and represented in the figures and described in the present description, there will be described one example of a module transmission sequence in accordance with the present invention in a simplified network comprising only modules of one type, communicator modules COM, for example.

Three inter-transmission silence time intervals or time-delays of increasing duration are defined, for convenience respectively called: "meaningful message time-delay", "higher order candidature time-delay" and "lower order candidature time-delay". The duration of the silences or time-delays is calculated by each CODL from the average value THM (FIG. 13) calculated from the duration of the basic bits received B0 and B1. Each time-delay is divisible into elementary periods of silence $SIL(1) = 5/2$ THM common to all the network.

The total duration of a silence is defined by a number N where $SIL(N) = N \times SIL(1)$.

In this simplified example, the message time-delay signifying a value corresponding to SIL(8), the higher order candidature time-delay has a value corresponding to SIL(10) and the lower order candidature time-delay has a value corresponding to SIL(13).

Each module comprises a counter the content of which represents the number of the module authorized to transmit a meaningful message at a given time.

In accordance with the present invention, the duration of the inter-transmission time-delays SIL(N) makes it possible, by means of the CODL unit which each module comprises, to sequence any transmissions from these modules as follows:

the transmitter candidate authorized to transmit is allowed to transmit at the end of a time-delay corresponding to said meaningful message time-delay after the last signal present on the line, that is, in this example, a time-delay of value SIL(8);
  a candidate message SXM is allowed to be transmitted from a transmitter candidate the order number of which does not immediately follow the order number of the module which has just transmitted and of which the order number is greater than that of the module which has just transmitted, at the end of a time-delay corresponding to said higher order candidature time-delay after the last signal present on the line, that is at the end of a time-delay of value SIL(10);
  the counter of each module is incremented after each meaningful message transmitted after a time-delay SIL8 and each candidature message SXM transmitted after a time-delay of value SIL(10);

a candidature message SXM is allowed to be transmitted from a transmitter candidate of lower order than that which has just transmitted after a lower order candidature time-delay after the last signal present on the line, that is a time-delay of value SIL(13);

the counter of each module is reinitialized after a candidature message transmitted after a low order candidature time-delay such that the first order module is authorized to transmit a meaningful message.

At the level of each module the sequencing of these transmissions is assured by CODL which comprises, as will emerge from the remainder of the description, means for measuring time and determining the value of inter-transmission time-delays.

By virtue of the process described hereinabove, there occurs a cycle of transmissions during which all the modules have the opportunity to transmit and no module has any advantage over any other, since once a module has terminated its transmission, which may be limited in time, the modules of higher order number have the opportunity to transmit. Once the highest order candidate has transmitted its message, after a time-delay of value SIL(13) has elapsed, the lower order transmitter candidates attempt to transmit SXM, the counters having been reinitialized. It is seen that, because of this system, the modules with higher order numbers are not favoured relative to the modules with lower order numbers and vice versa.

It will be noted that the only "information collision" that can occur is that which may arise between a number of candidature messages SXM emanating from a number of modules of higher rank than the module authorized to transmit. It has already been seen that this signal is the only signal that can be transmitted simultaneously or disturbed by interference without its implicit content being modified by this, since it is a basic signal ITP consisting of the presence of signal during a time TH. It will be described later how in practice, in the embodiment described in detail in this application, the risk of various signals SXM colliding is nevertheless avoided.

There will now be described the sequencing of transmissions in a network such as that described in the present application comprising communicator modules COM and satellite modules SAT.

Each communicator COM is distinguished by a number "m" (COMm) and each satellite SAT by its own number "n" and the number "m" of its associated communicator; SATn, m: SAT number "n" associated with COMm. Each COMm or SATn, m transmits, according to one particularly advantageous characteristic of the present invention, in a range ESIL(N) which is reserved for it and which is defined as follows:

$$ESIL(N) = SIL(N) + K + ALEA$$

where $K = -\frac{3}{8}$ THM and ALEA has a random value for CODL such that $0 < ALEA < 5/4$ THM.

In accordance with one characteristic of the invention, the transmissions from the SAT associated with a given COM are sequenced by means of time-delays which are referred to for convenience as "secondary" time-delays and which may be either meaningful message time-delays or higher order candidature time-delays. Similarly, transmissions from communicators are sequenced by means of time-delays which are called "primary" time-delays and may also be either meaningful message time-delays or higher order candidature time-delays. The arrangements are such that, generally speaking, the satellites associated with a given communicator all have the opportunity to transmit a message before moving on to the higher order communicators and to their associated satellites. Table I below explains the sequencing of transmissions by the time-delays between messages SIL (N), the duration of a time-delay SIL (N) being determined as previously by the equation:

$$SIL(N) = N \times SIL(1)$$

TABLE I
Sequencing of transmissions

SIL (13): End of cycle time-delay, also called lower order candidature time-delay. The counters of the modules are reinitialized after a silence of duration greater than SIL (13) so that the transmitter candidates of lower order than the last module having transmitted a message can send a meaningful message or candidature message after the time-delays concerned (see below).

SIL (12): Time-delay called for convenience the "control" time-delay. Each SATn,m which has not received any message from their associated COMm for a predetermined time (in practice a few minutes) can transmit a message in the range defined by ESIL (12).

SIL (11): Time-delay called for convenience the "second intermediate time-delay". This time-delay indicates that the sequence reserved for COMj and SATi,j is terminated, that no COMk of number k > j has occurred and that there is still at least one transmission candidate SATn,m such that m > j + 1. The SAT in this situation attempt to transmit a candidature message SXM in the range defined by ESIL (11).

SIL (10): SIL (10) is a higher order candidature time-delay for the communicators and is called for convenience the "higher order candidature primary time-delay". SIL (10) indicates that the sequence reserved for COMj and SATi,j is terminated, that no COM j + 1 or SATi,j + 1 has shown up and that there is at least one COMm of number m > j + 1 transmission candidate. All the COM in this situation attempt to transmit a candidature signal SXM in the range defined by ESIL (10).

SIL (9): SIL (9) is a time-delay called for convenience the "first intermediate time-delay" and indicates that the sequence reserved for COMj and SATi,j is terminated, that the communicator COMj + 1 has not shown up and that there is still at least one transmission candidate SATn,j + 1. Each SATn,j + 1 attempts to transmit a candidature message SXM in the range defined by ESIL (9).

SIL (8): SIL (8) is a meaningful message time-delay for the communicators and is called for convenience the "meaningful message primary time-delay". SIL (8) indicates that for the sequence reserved for COMj and SATi, j is terminated. A COMj + 1 may begin a message in the range defined by ESIL (8).

SIL (7): SIL (7) is a time-delay associated with the communicators and is called for convenience the "double numbering primary time-delay". In the event of identical numbering (abnormal situation) of two or more COM, the risk of "collision" between a number of meaningful messages transmitted by these COM is limited, since the start of transmission

TABLE I-continued
Sequencing of transmissions

| | |
|---|---|
| | occurs in a range of durations determined by the formula ESIL (10) comprising a random value ALEA as explained hereinabove. The "fastest" COM transmits in the range defined by ESIL (8) and provisionally inhibits each other COM with the same number. These then transmit in the range defined by ESIL (7). |
| SIL (6): | SIL (6) is a higher order candidature time-delay associated with the satellites and is called for convenience the "higher order candidate secondary time-delay". SIL (6) indicates that in the sequence reserved for COMj and SATi,j there is still a SATn,j such that n > i + 1. All the SATs in this situation attempt to transmit a higher order candidature message SXM in the range defined by ESIL (6). |
| SIL (5): | SIL (5) is a meaningful message time-delay associated with the satellite and is called for convenience the "meaningful message secondary time-delay". SIL (5) indicates that in the sequence reserved for COMj and SATi,j the period reserved for SATi,j is terminated. A SATi + 1, j may start a message in the range defined by ESIL (5). |
| SIL (4): | SIL (4) is a time-delay associated with the satellite called for convenience the "double numbering secondary time-delay". In the event where, eroneously, a number of SATs associated with a given communicator have the same number, the random time of transmission starts makes it possible to avoid collisions between meaningful messages from these SATs. The "fastest" of them transmits in the range defined by ESIL (5) and provisionally inhibits the others which will transmit in the range defined by ESIL (4). |
| SIL (3): | SIL (3) is a reception acknowledgement time-delay and enables any COM or any SAT to which a data message is addressed to transmit in the range defined by ESIL (3) either an SOK message or an ROK message. |

Figure 17:
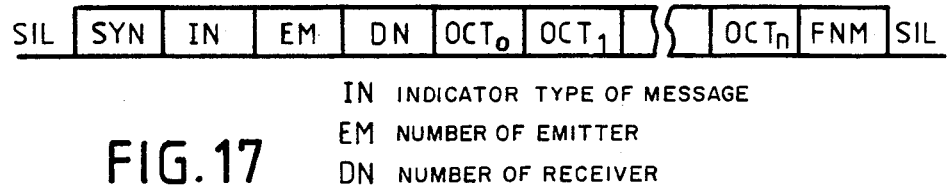
FIG. 17 shows the composition of a data message sent by a module in accordance with the present invention.

FIG. 17 shows the structure of a data message as sent by the modules. A message of this kind, which of course occurs between two silence areas SIL, comprises a start of transmission SYN, a message type indicator IN, the transmitter number EM, the destination number DN, followed by a series of bytes OCT which may, in certain embodiments, be limited to four bytes, for example, and an end of message FNM. Table II below sets out the correspondence between the values of the message indicator IN and the type of message.

TABLE II

| | |
|---|---|
| IN = 0 | Message transmitted by SAT (EM, DN) to COM (DN) |
| IN = 1 | Message transmitted by COM (EM) to SAT (DN, EM) |
| IN = 2 | Message transmitted by COM (EM) to COM (DN) |
| IN = 3 | Message transmitted by SAT (EM, DN) not having had any message addressed to it for a predetermined time, in practice a few minutes. |

In normal operation, once all the associated SAT have been initialized, with a numbering of COM or of SAT without identical numbering, the only possible collisions are in ESIL (6-9-10 or 11) on the message SXM which is merely an indicator and does not carry any meaningful data, and any interference affecting it does not disturb the sequencing.

A non-initialized network having numerous COM or SAT with multiple numbering and subject to disturbance by interference will have an increased number of possible collisions. Its operation is then slowed down, but the structure described here ensures that each cycle is executed without favoring the COM or SAT of lower number relative to the COM or SAT of higher number.

No definitive blocking is possible and if a transmitter is prevented from transmitting in one cycle, it can transmit in the following cycles. Also, a transmitter candidate can always be realigned in the course of the transmissions of a cycle, without waiting for the beginning of the next cycle. Any alignment error within the cycle can be recovered at any time by checking the implicit and explicit sequencing information and the content of the messages.

Moreover, the explicit and implicit content of the messages and of the sequencing embodies all the information necessary for improved utilization of the network, whether in terms of user errors or interference.

It will also be noted that combining the modulation-demodulation process with the coding-decoding process further improves the disturbance immunity characteristics of the coding-decoding process. There is obtained in this way a data communication network which is particularly insensitive to such disturbances.

In particularly difficult cases, the intelligent control terminals or the processing subsystems may, using this information, operate at a higher structural level on the transmission speed or on the message length and transmission area length to optimize the transmission quality and efficiency.

The four basic functions of the line coding-decoding system CODL will now be described.

Data decoding (DCOD)

The role of the DCOD function is to carry out the following operations on reception of the signal MRE from IACL:
- decoding the received signal MRE from IACL and transmission to TGMS (FIG. 12);
- calculating the transmission speed of the received signal;
- validity check and transmission speed discrimination;
- line silence detection.

As previously seen, the read signal MRE from IACL is meaningful in the time domain only at the falling trailing edge, corresponding to the moment of extinction of the carrier frequency on the line. The encoding of bits B0 and B1 being effected by varying the duration so that B0 has a duration TS0 (FIG. 13b) and B1 has a duration TS1 (FIG. 13c), the discrimination of B0 and B1 relies on the following functions:
- timing of the time interval T (time-delay between two successive falling edges of MRE) (FIG. 18);
- validity check on T in the fixed speed range (FIG. 18);
- message start SYN synchronization check (FIG. 16) and in-message synchronization check (FIG. 18);
- initializing calculation of THR (received TH, FIG. 13) at start of message (FIG. 19);
- calculating the running average for THR during the duration of a message (FIG. 20) (TRM=average value of THR);
- discriminating B0 and B1 and outputting data to TGMS (FIG. 21);
- transmitting service and control signals to TGMS.

Figure 18:
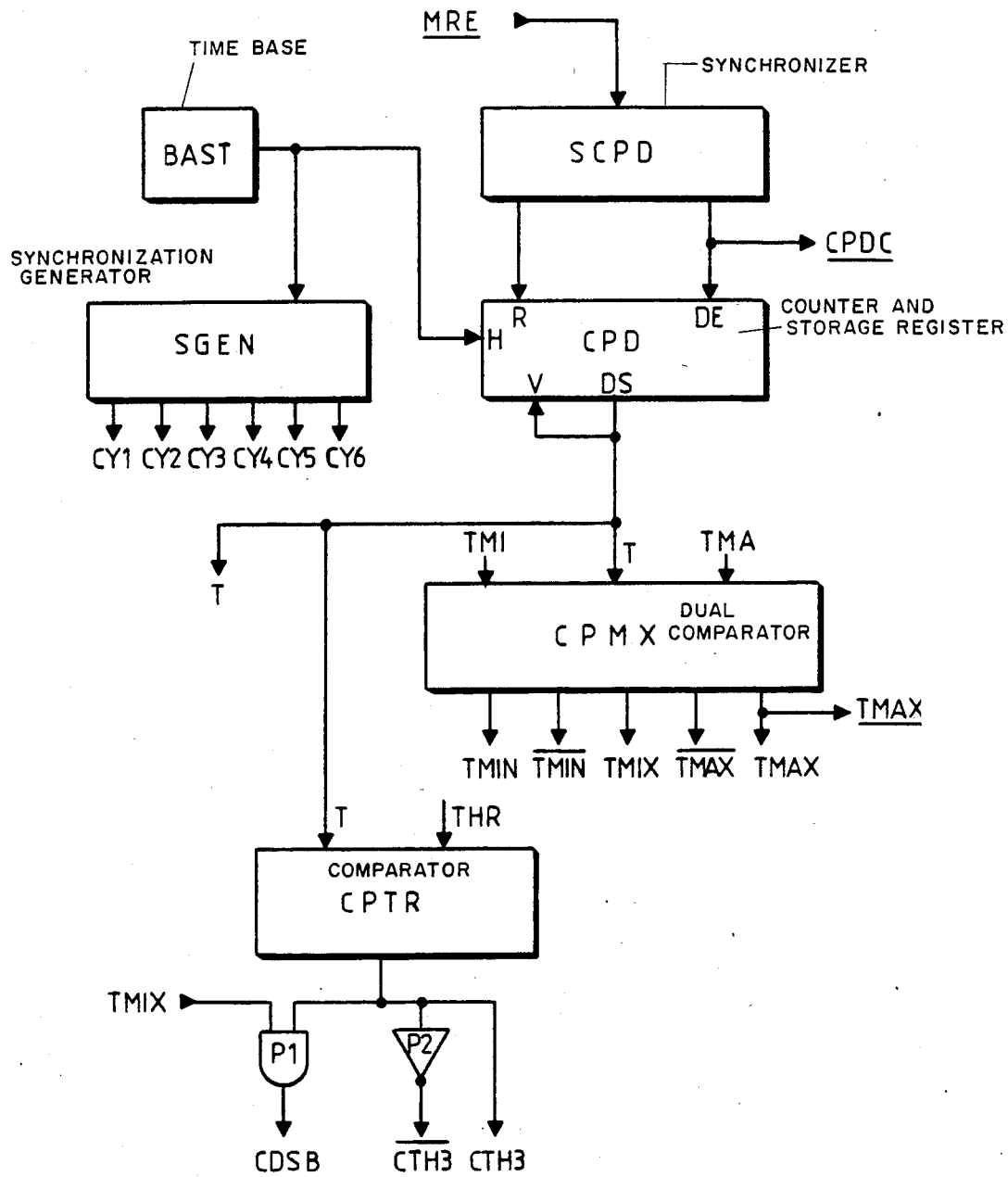
FIGS. 18 through 21 are schematic diagrams of hardwired logic units of the data decoder in the embodiment described here of the line coder-decoder associated with each module.

FIG. 18: CPD consists of a counter and a storage register.

The counter is incremented by a clock from a timebase BAST. On each falling edge of MRE, the synchronizer SCPD supplies (CPD input DE) a command to transfer data from the counter to the register followed by a command (CPD input R) to reset the counter to zero. The output of CPD constitutes the value of the time T between two successive falling edges of MRE. In the case of a capacity overflow, CPD locks its incrementing (CPD input v). CPMX is a dual comparator which verifies that the duration T is between two given values TMI (minimum duration) and TMA (maximum duration) which define the selected range of speeds.

The signal TMIN is such that T<TMI.
The signal TMAX is such that T>TMA.
The signal TMIX is such that TMI<T<TMA.

The synchronization generator SGEN provides time-shifted synchronization clocks CY1 through CY5, in the order CY1 to CY5, from the timebase BAST. These clocks are used for general DCOD sequencing.

Figure 20:
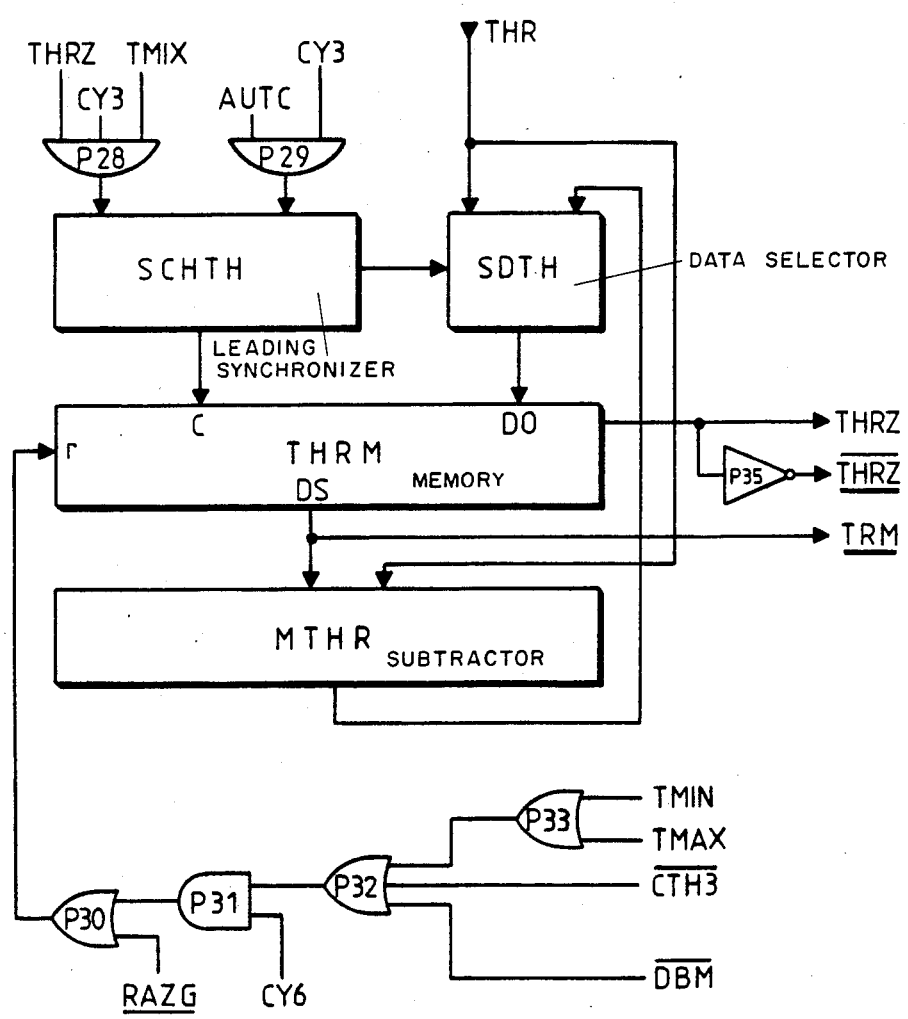

CPTR is a comparator for the measured value T with two calculated limits TRM and 3 TRM (FIG. 20). By design, the duration TS1 of a bit B1 is TS1=3/2 TH and the duration TS0 of a bit B0 is TS0=5/2 TH (FIG. 13).

The criterion for the validity of T relative to the TRM measured since the beginning of the message is obtained by comparing T with two thresholds S0 and S1.

$$S0 = TS1 - \frac{TS0 - TS1}{2} = TRM;$$

$$S1 = TS0 + \frac{TS0 - TS1}{2} = 3TRM$$

If T is such that $S_0 < T < S1$, the duration T actually represents a data bit; otherwise T is incoherent and does not conform to the system standard. The signal CTH3 provided by the comparator CPTR is such that CTH3=1 for $S_0 < T < S1$.

The gate P2 produces the complemented signal $\overline{CTH3}$; the gate P1 implements the logic combination CDSB; such that CDSB=TMIX·CTH3·CDSB=1 when T is within the limits defined by the system.

FIG. 20: the general functioning of DCOD is sequenced by the presence or not of a value of TRM indicated by the signal THRZ (TRM=0).

On power up the general initialization signal RAZG resets to zero the memory THRM. In operation memory THRM is also reset to zero if:

T is outside the time range TMI, TMA. The gate P33 applies the "OR" function to signals TMIN and TMAX.

T is not in the time range TRM, 3TRM indicated by the signal $\overline{CTH3}$.

When TGMS indicates the end of message (signal FMES, FIG. 21) which sets to zero the start of message memory DBM (FIG. 21) ($\overline{DBM}=1$). The gate P32 applies the "AND" function to the aforementioned three conditions and the gate P31 synchronizes the resetting to zero at time CYX.

Figure 19:
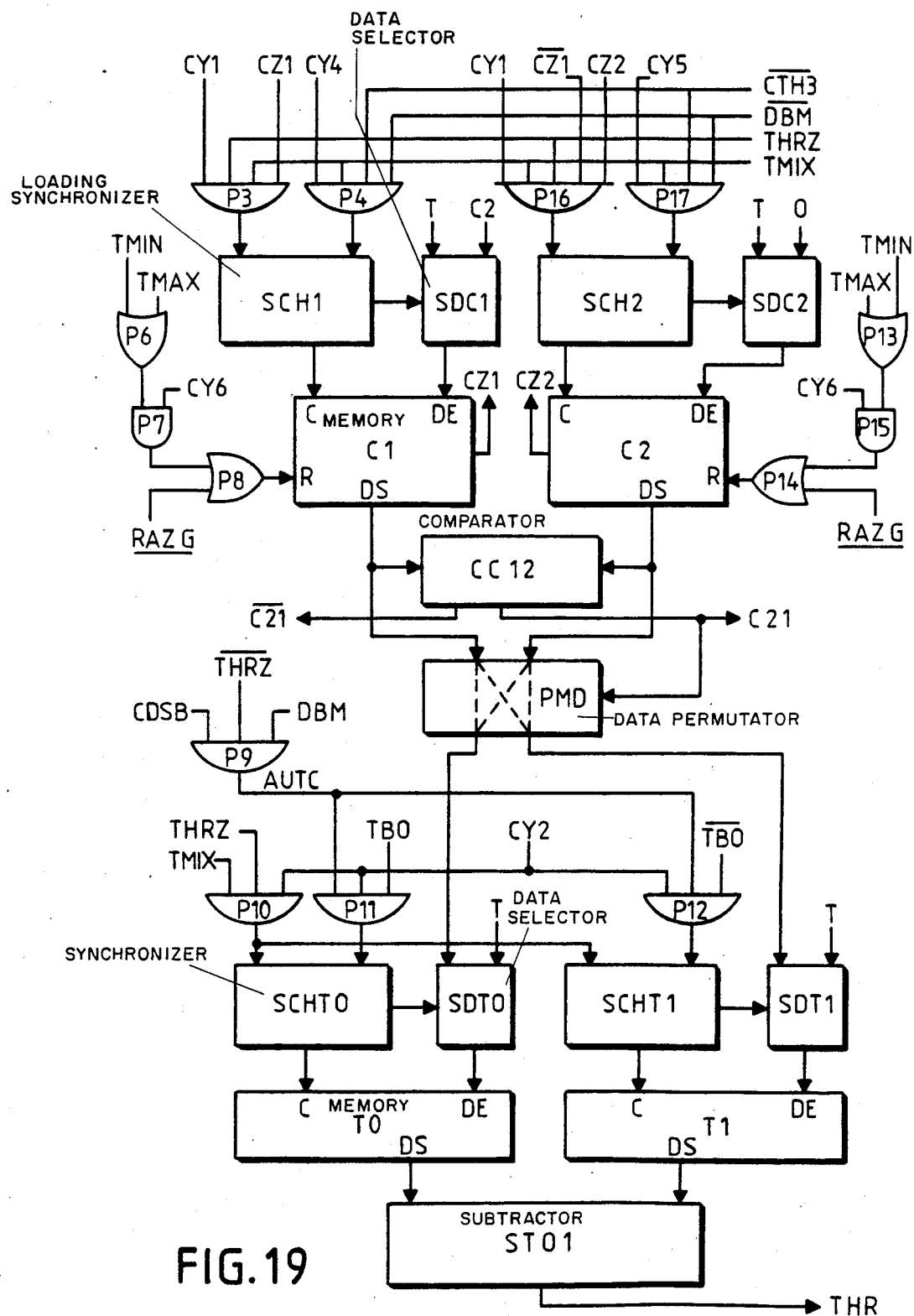

FIG. 19: operation proceeds in two phases:

THRZ active: the gate P3 enables the memory C1 to be loaded if the content of C1 is null (condition CZ1=1 supplied by C1) with the condition TMIX at time CY1. The loading synchronizer SCH1 supplies to the memory C1 (input c) a loading pulse and orients the data selector SDC1 to supply the value T to C1. When CZ1=0 (C1 loaded), the new value of T is loaded into C2 according to the same process via the gate P16 and the data selector SDC2. A comparator CC12 compares the two successive values T1 and T2 contained in C1 and C2. The result C21 of the comparison determines which the two times belongs to B0 or to B1 since T of B0>T of B1. The signal C21 controls a data permutator PMD which directs the values of $T_1$ and $T_2$ to the memories T0 and T1 so that the content of T0 corresponds to B0 and that of T1 to B1.

The gate P10 implements the condition for loading T0 and T1 with the condition TMIX at time CY2. The synchronization of loading of T0 (SCHT0) and T1 (SCHT1) supplies a pulse for loading at T0 and T1 and orients the data selectors SDT0 and SDT1 to supply the values $T_1$ and $T_2$ to T0 and T1.

A subtractor STO1 operating on the values contained in T0 and T1 supplies the value of TRM which is directed to the memory THRM (FIG. 20).

The gate P18 authorizes the loading of TRM if TMIX=1 during the first phase or THRZ=1 at time CY3. The loading synchronizer SCHTH sends a loading pulse to the memory THRM and orients the data selector SDTH to supply to THRM the value of TRM from STO1. The new value $T_3$ of T is then compared with TRM by CPTR (FIG. 18). Two cases are possible:

CTH3=0 signifies that T does not correspond to the duration criteria. As previously shown, $\overline{CTH3}$ resets to zero the content of THRM. In this case the loading sequence for C1 and C2 resumes (FIG. 19). The start of message memory not being set ($\overline{DBM}=1$) and $\overline{CTH3}$ being equal to 1, the gate P4 commands the loading of C1 at time CY4 with the last good value of T contained in C2, the loading synchronizer SCH1 orienting the data selector SDC1 to load the data of C2, the gate P17 executes at times CY5 the loading of the value 0 into C2 under the same conditions as P4. The sequence continues with a further calculation of THR, as previously shown.

CTR3=1 signifies that T corresponds to the duration criteria. The value TRM remains stored in THRM and THRZ=1 (no-null data item in THRM).

Figure 21:
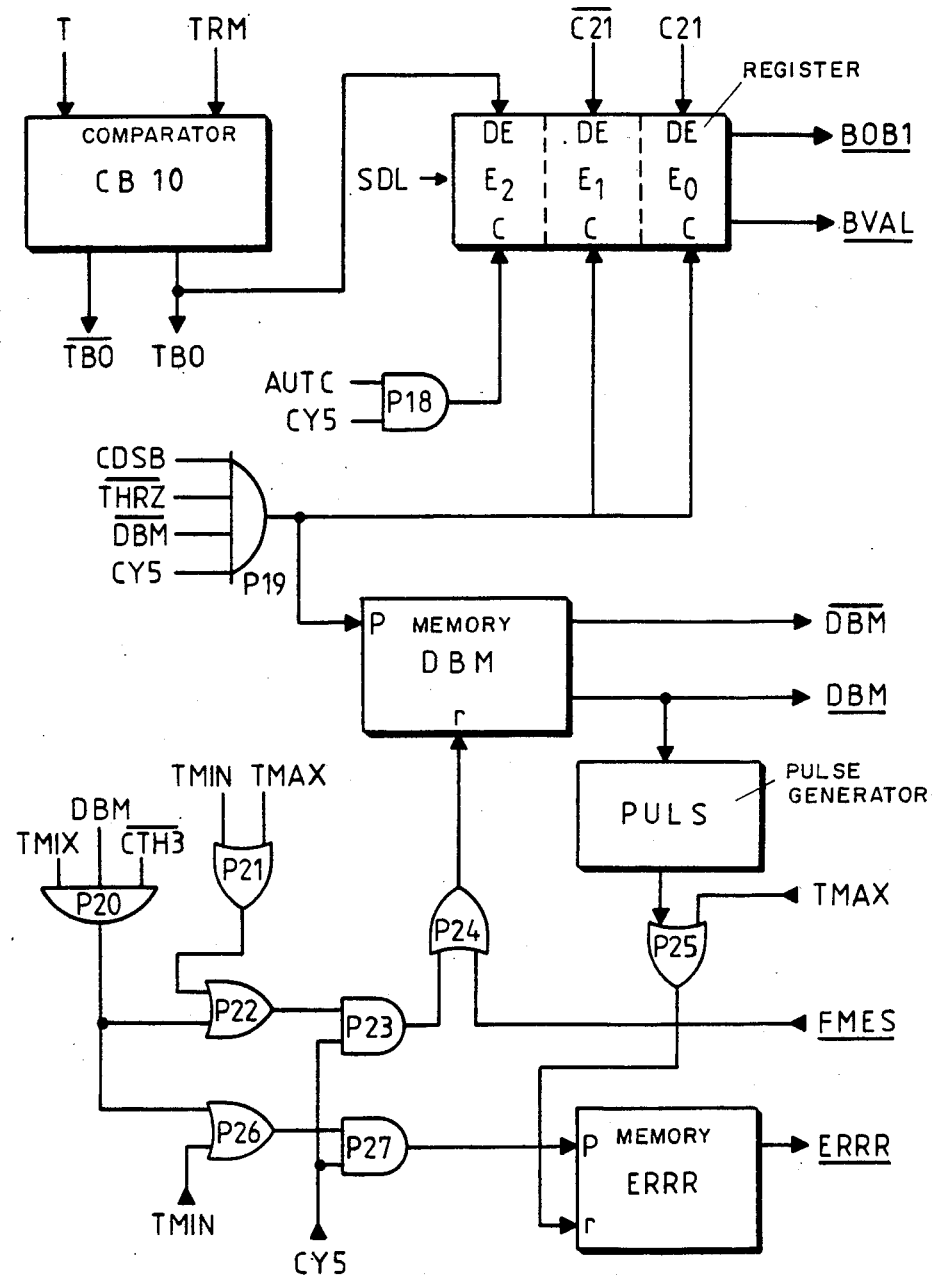

FIG. 21: the gate P19 applies at time CY5 the "AND" condition to CDSB (FIG. 19), $\overline{THRZ}$ (FIG. 20) which has just gone to 1, and DBM which is at 1, since the memory DBM is at 0. P19 sets the start of message memory DBM to 1. Also, P19 commands the loading of the first two stages $E_0$ and $E_1$ of a register SDL with the value of B0 and B1 which has been determined by the comparator CC12 (signal C21 and $\overline{C21}$) (FIG. 19). Phase 1 is terminated and phase 2 begins:

$\overline{THRZ}$ active: the new values of T which are to follow are compared with the value 2 TRM by the comparator CB10. When T<2TRM it is bit B1 and when T>2TRM it is bit B0. The value of bit B0 or B1 (signal TB0) is loaded into the third stage $E_2$ of the register SDL by a load instruction from the gate P18. This gate receives the signal AUTC from the gate P19 (FIG. 19) such that AUTC=(CDSB·THRZ·DBM). AUTC signifies that T corresponds to the time ranges, that the memory THRM contains a value TRM, that the start of message memory has changed state. P18 synchronizes the loading of STL on time CY5.

FIG. 19: the successive values of T are to be loaded into the memories; T0 if TB0=1 and T1 if TB0=0 by the loading command issued by gates P11 and P12, on the condition AUTC=1 and at time CY2. The data selectors SDT0 and SDT1 are oriented to supply the data item T to the memories T0 and T1. A new value of THR is thus obtained.

FIG. 20: each value THR stored in THRM is transferred into a circuit MTHR which subtracts from it the new value of THR calculated for STO1. The result of the subtraction weighted by a coefficient K is added to the value THR to give a running average THR which loads the memory THRM. The gate P29 synchronizes this loading on CY3 with the condition AUTC=1. The loading selector SDTH is oriented so as to direct the data from MTHR to THRM. TRM represents the average value of THR.

FIG. 21: the register SDL indicates to TGMS that it has data ready B0, B1 by the signal BVAL. On each change of state of BVAL, SDL shifts its information from stage $E_2$ to $E_0$ to supply the successive values of B0 and B1 to TGMS.

The start of message memory is reset to zero by the gate P24 either at the end of message FMES from TGMS of at time CY5 (gate P23) if gate P21 or P20 authorizes it (via gate P22). P21 verifies the duration conditions of T (TMIN and TMAX) and P20 the duration conditions of T by $\overline{CTH3}$ (TRM<T<3TRM). If P20−1 or TMIN=1 the gate P26 sets the receive error memory ERRR at time CY5 (gate P27). This memory is reset to zero when the signal DBM is set by the pulse generator PULS or when TMAX−1 indicating that the message has terminated.

Time calculation (CALT)

Each transmitter-receiver COM or SAT has its own timebase which defines the duration of the bits B0 B1 on transmission as well as the duration of silences. In the present invention, one characteristic of the time-bases is that they are based on inexpensive means such that the value of the frequency "f" of said timebase is set only with low accuracy relative to the nominal frequency "fo" (in one application of the present invention, this precision is ±10%, that is ±20% maximum because the frequencies "f" of two transmitter-receivers set to extreme values).

Given that the value of silences is determined by each transmitter-receiver COM or SAT using its own timebase and that the duration of the silences is, by virtue of the very nature of the system, operative in defining the overall sequence of operation, the function CALT is implemented so as to correct its timebase value according to measured values of TRM provided by DCOD during the read cycles.

Figure 22:
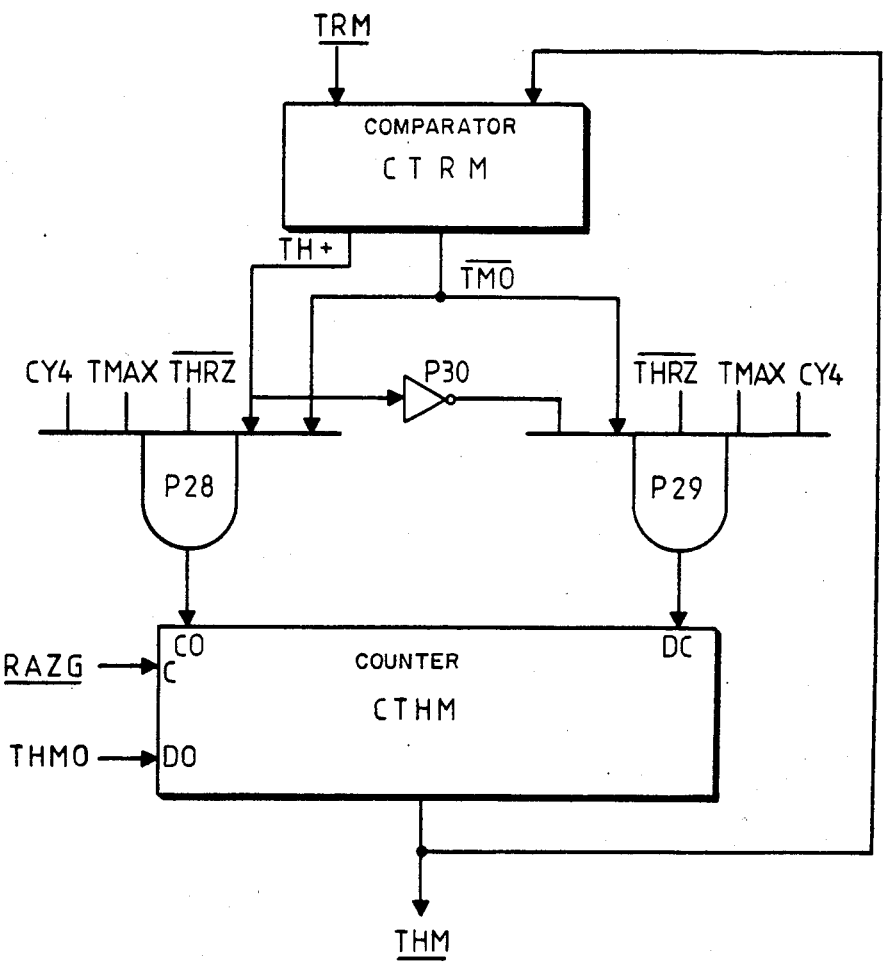
FIGS. 22 and 23 are functional schematics of hardwred logic units of a time calculator of the line coder-decoder.

FIG. 22 shows the CALT organization: a counter CTHM is initialized on power-up by the general reset to zero signal RAZG which causes the loading into CTHM of a value THM0 which corresponds to a nominal average value of the time value TH. The output of this counter is thus THM, the average value of TH, which is used as a timebase for transmission and counting silences. A comparator CTRM applies duration comparison in respect of the value TRM, measured and averaged by DCOD during the reception cycles, and the value THM from CTHM. CTRM controls the gate P28 and P29 by means of two signals: TH+ which signifies when it is equal to 1 that TRM>THM and its complement $\overline{TH+}$ (P30), and $\overline{TMO}$ which signifies that TRM and THM are different. The gates P28 and P29 are enabled when $\overline{THRZ}=1$ (TRM not null) and TMAX=1 (start of silence after reading) and $\overline{TMO}=1$ (TRM≠THM) at time CY4. When TRM>THM the gate P28 is enabled by TH+ and the gate P29 disabled by $\overline{TH+}$. P28 supplies to CTHM a pulse on its count input (CO) which increments the value THM by unity. When TRM<THM, the gate P29 decrements THM by unity via the DC input of CTHM. On each reading of messages from other transmitter-receivers, the COM or SAT in question corrects its value of THM by making it tend towards an average of the TRM received. When it sends in its turn, it will use a corrected value THM such that the THM of each transmitter-receiver tend towards a common signal value.

Data encoding (CODD)

The role of the CODD function is to encode messages from TGMS in B0 B1 form and to transmit them to IACL to transmit the coded messages over the line. TGMS gives a transmit instruction EEMS to CODD at the end of an integer number of silences the elementary duration of which is TSO (TSO=5/2 THM). In one application of the present invention, the actual start of transmission is in a range of width TS0/2 situated between ¼ TSO and ¾ TSO after a first silence of duration TSO. The start time within the range is defined by a random value of the time ALEA such that 0<A-LEA<½TSO. Also, the transmission is preceded by a signal ITP of duration THM. The exact time of start of transmission TDE is thus given by the following equation:

$$TDE = TSO + \tfrac{1}{4}TSO + ALEA - THM$$

Since by design TSO=5/2 THM, the value of TDE is such that:

$$TDE = (2 + \tfrac{1}{8})THM + ALEA$$

$$0 < L\ ALEA < 5/4 THM$$

Figure 23:
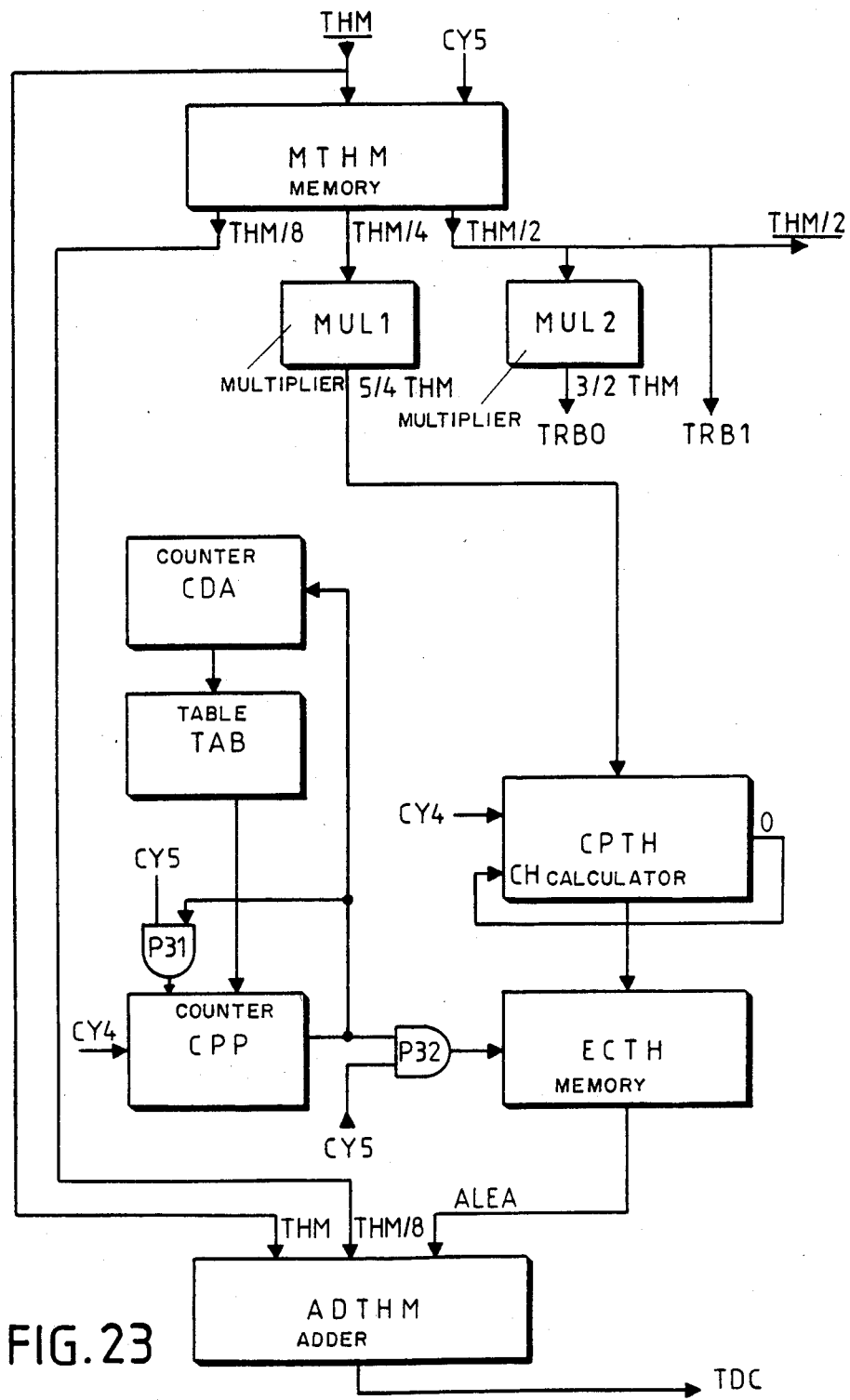

FIG. 23 shows how all the elementary time values needed by the CODD functions are obtained from the value THM supplied by CALT. The value of THM is stored in a memory MTHM on clock cycle CY5. The data item THM is stored in "pure binary" form at the output of MTHM so that by simple shifting of the weights of the bits MTHM supplies ½THM, ¼THM, ⅛THM.

The multiplier MUL1 multiplies ¼ THM by 5 to provide the maximum value of ALEA. The multiplier MUL2 multiplies ½ THM by 3 to provide the value of the time TRBO corresponding to the rest phase of the signal B0 (FIG. 13b), whereas the rest phase of B1 (FIG. 13c) is obtained directly by means of ½ THM (TRB1). ALEA is calculated by a counter CPTH which is decremented by a clock CY4 and reloaded to the value 5/4 THM when it reaches zero. A second counter CPP is loaded with a series of pseudo-random numbers contained in a table TAB. CPP is decremented on the clock CY4. When it arrives at zero, it supplies to the sampling memory ECTH a loading pulse and it supplies to the counter CDA an incrementing pulse so that CDA provides a new address to table TAB. The table TAB gives a new random number which is loaded on clock cycle CY5 into CPP via the gate P31 and the CPP cycle begins again, so that the frequency of the CPP output signal is pseudo-random. The memory ECTH thus samples on cycle CY5 via the gate P32 pseudo-random values of the content of CPTH in a range of values from 0 to 5/4 THM corresponding to the signal ALEA. An adder ADTHM calculates the CODD start of transmission cycle time TDC such that:

$$TDC = THM + \tfrac{1}{2}THM + ALEA$$

Figure 24:
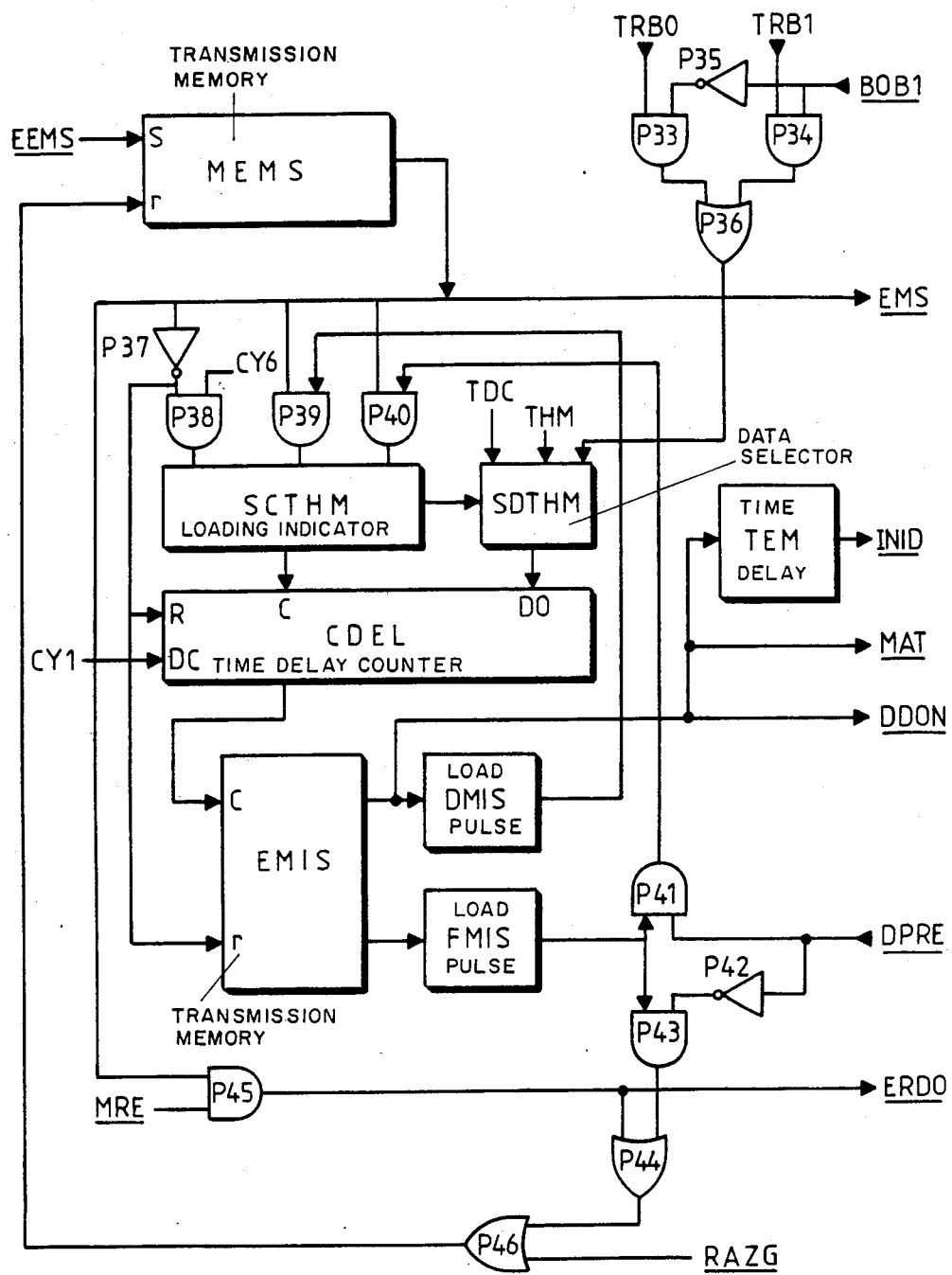
FIG. 24 is a functional block schematic of a hardwired logic data encoder of the line coder-decoder.
Figure 25:
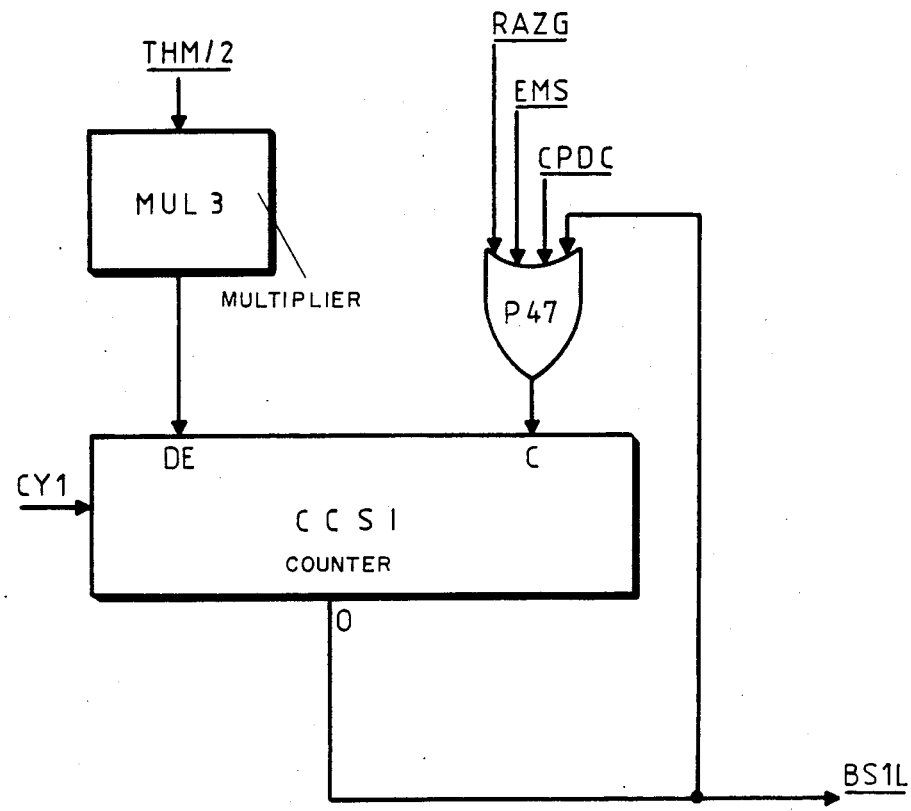

FIG. 24 shows the system for formatting B0 B1 of CODD.

The transmission cycle is controlled by the transmission memory MEMS. When MEMS is idle, its output signal EMS is at 0 and $\overline{EMS}$ is at 1 (gate P37). The gate P38 is enabled on each clock cycle CY6 and supplies to the loading selector SCTHM a pulse which is transmitted to the loading input of the time-delay counter CDEL. SCTHM controls the data selector SDTHM to present to the counter CDEL the previously calculated data item TDC. When TGMS supplies to MEMS the start of transmission signal EEMS, the signal EMS goes to 1. The counter CDEL is unlocked by $\overline{EMS}$ (input R of CDEL) and CDEL is decremented by the clock CY1.

When the time-delay TDC is terminated, CDEL supplies to the transmission memory EMIS a pulse which causes it to go to 1. DMIS sends a loading pulse on the rising edge of the signal from EMIS which activates the gate P39 so that, by means of a process equivalent to loading TDC, CDEL stores the value THM. CDEL counts down the time THM and causes EMIS to change state again, going to 0. On the falling edge of the signal from EMIS, EMIS supplies a loading pulse to the gate P41. This pulse is transmitted to the gate P40 if TGMS gives the data ready signal (DPRE). The gate P41 then causes the duration TRB0 (bit B0) or TRB1 (bit B1) to be loaded into CDEL, according to the value of the bit B0 B1 to transmit, as supplied by TGMS (gate P33 through P36). The output signal from EMIS is sent to IACL (signal MAT) to modulate the carrier, to IACL (signal INID) with a time-delay TEM to block the IACL demodulator during the transmission phase, and to TGMS to formulate a data request (DDON). TGMS then supplies a new data item B0 B1. At the end of the message, TGMS no longer supplies the signal DPRE. The gate P43 is enabled by $\overline{DPRE}$ at the time FMIS requests loading of data. P43 resets the memory MEMS to zero via gates P44 and P46. During transmission the gate P45 is enabled by EMS. If a reception signal MRE from IACL is detected, P45 supplies a data error signal ERDO to TGMS (collision with another transmitter or reception of interference). ERDO resets to zero the memory MEMS via gates P44 and P46. On power up, the signal RAZG initializes to zero the memory MEMS.

Silence counting (CSIL)

The role of CSIL (FIG. 25) is to indicate to TGMS the silence area changes. A counter CCSI is loaded with the value of the silence 5/2 THM calculated by the multiplier MUL3 from ½ THM. CCSI is decremented by a clock CY1. When the time corresponding to 5/2 THM has elapsed, CCSI sends a pulse BS1L to TGMS indicating the silence area change and is reloaded by the gate P47, to resume its cycle; CCSI is reloaded at the end of a message in receive mode by the signal CPDC supplied by DCOD. It is loaded during the signal EMS from CODD so that the counting down of silences begins immediately after transmission of a message ends.

Finally, CCSI is loaded on power up by RAZG.

It goes without saying that numerous modifications may be made to the network which has just been described, in particular regarding the structure of the modules, without departing from the scope of the present invention.

There has just been described with reference to FIGS. 12 through 25 one embodiment of a line coder-decoder in accordance with the present invention, implemented in hardwired logic. It goes without saying that a module of this kind may be implemented in programmed logic.

In this regard, it is necessary to bear in mind that FIGS. 12 through 25 show a set of basic units implementing basic subfunctions providing for the implementation of four functions of the line coding-decoding unit CODL, namely the data decoding function DCOD, the time calculation function CALT, the data coding function CODD and the silence counting function CSIL. The man skilled in the art therefore has all he needs to implement a program to be run by a microprocessor, for example, and embodying the basic functions as described with reference to FIGS. 12 through 25. The program may be stored in a programmable read only memory (PROM) or in a reprogrammable read only memory (EPROM). A plurality of basic digital signals corresponding to the general set points are naturally recorded in these memories. A random access memory is also associated with the microprocessor and may have written in it, in the manner well known to the man skilled in the art, the variable set points, in this instance the order numbers of the SAT and COM modules.

It will also be seen that everything concerning the protocol for exchange of information between the modules (for example, the signals SXM, SOK, ROK, etc) has been explained in general terms sufficient for a man skilled in the art to be able to implement an appropriate program so as to utilize the modules of the network in a way conforming to the method in accordance with the present invention.

There will now be described with reference to FIG. 26 one application of a network in accordance with the present invention to the distribution of electrical power within a dwelling.

Electrical power, in practice alternating current at 110–220 V 50–60 Hz, is distributed by means of a set of conductors terminating at socket means of a set of conductors terminating at socket outlets, switches, contactors and other forms of control device. In practice numerous conductors are often required for controlling, for example, a single lamp. When it is necessary to control the same lamp from two switches, it is well known that it is necessary to provide a "two-way switching circuit" between the two switches.

When it is necessary to control an electrical device from numerous switches, as is well known use is often made of "contactors" which in practice comprise switches remotely controlling a relay which operates the electrical device concerned.

As is known, this leads to the installation of an extensive network of electrical conductors in a dwelling.

In accordance with one aspect of the present invention, the electrical power distribution network within a dwelling consists of a power distribution line serving the various control devices and the various controlled electrical appliances, in the form of lamps, for example. This network is connected to a central processor PR (FIG. 26) through the intermediary of a communicator COM. A satellite module SAT is associated with each of the control devices and with each of the controlled electrical appliances.

Figure 26:
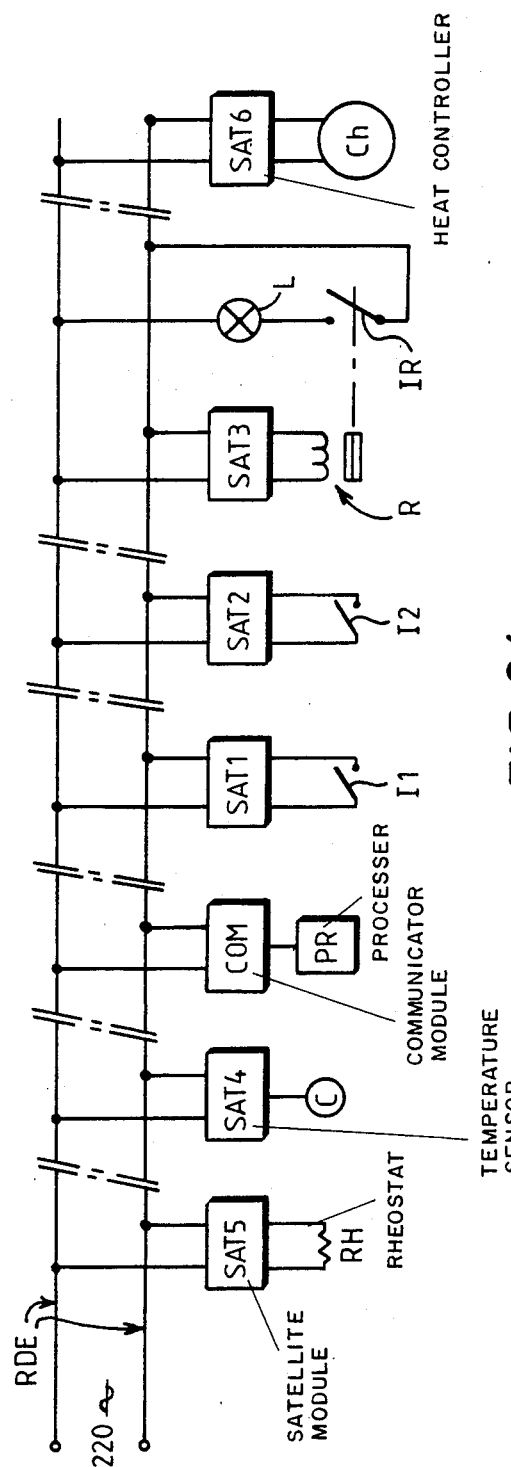
FIG. 26 is a schematic showing the application of a network in accordance with the present invention to electrical power distribution within a dwelling.

FIG. 26 shows this aspect of the present invention in a highly schematic form. A lamp L must be controlled either by a switch I1 or by a switch I2. A satellite SAT1, SAT2 is associated with each of the switches I1, I2 and a satellite SAT3 with the lamp L. The satellite SAT3 is connected to an actuator, in practice a relay R which controls a switch IR controlling the lighting of the lamp L. The switches I1 and I2 control the satellites SAT1 and SAT2.

The lamp L is controlled through the intermediary of the data communication network consisting of the electrical power distribution network RDE, the communicator COM associated with the processor PR and the satellites SAT.

When the user wished to light the lamp L, he operates the switch I1 or I2; this information is acted on by the satellites and the communication network in the manner described hereinabove and the lighting of the lamp L is in fact commanded by the processor PR through the intermediary of the data communication network.

It is therefore seen that in a dwelling comprising numerous lamps and other domestic appliances, it is possible to control the appliances through the intermediary of a central processor by means of actuators disposed at any location in the dwelling, without relying on two-way switching circuits, contactors or rheostats as used until now in the domestic distribution of electrical power. The electrical power distribution schematic is in fact programmed and can consequently be modified in the processor, which confers on an electrical power distribution installation in accordance with this aspect of the invention unprecedented versatility in use as compared with the usual techniques.

Moreover, thanks to the data communication network in accordance with the invention, this processor can control or monitor other functions including heating control, surveillance, alarms, doorbells, and so on usually implemented by means of thermostats and programmable timers, smoke detectors, intruder detectors, etc, each of these devices presently entailing the installation of specific connections by means of dedicated electrical conductors.

The processor can also control other functions as yet in restricted use, such as for example lighting a lamp at twilight and switching it off at a predetermined time, or opening entry or garage doors by means of an electronic key or digital code, such functions also requiring at present connections by means of dedicated conductors.

Thanks to the invention, the means implementing these functions may be connected directly or indirectly to the power distribution network with an SAT module associated with each of them, all dedicated connections being done away with.

By way of example, in FIG. 26 a satellite SAT 4 is connected to a temperature sensor C, a satellite SAT5 to a rheostat RH and a satellite SAT6 to a heating controller CH.

The user can set an optimum temperature using the reostate RH and the processor PR starts the heating CH when the temperature indicated by the temperature sensor C is lower than the set point selected on the rheostat RH.

It goes without saying that numerous modifications may be made to the embodiments described and represented without departing from the scope of the present invention.

We claim:

1. A contention method in a network of at least two addressable modules connected by at least one non-dedicated transmission line, in which time is subdivided to define transmission time slots and in which each module checks whether any signal is on the line before transmitting and transmits only when there is no signal on the line, wherein each module is assigned at least one respective first order number and has at least one counter the content of which is representative of the respective first order number of one of the modules currently authorized to transmit a meaningful message, at least three time intervals of silence between messages are defined, of increasing duration, namely the meaningful message time-delay, higher order candidature time-delay and lower order candidature time-delay, respectively, the modules having a meaningful message to transmit being transmitter candidate modules, and a message sent by a transmitter candidate module for which said first order number does not immediately follow that of the module which has just transmitted being a candidature message (SXM), and said time-delays of increasing duration are used to sequence transmission from modules as follows:

a transmitter candidate authorized to transmit transmits at the end of a time-delay corresponding to said meaningful message time-delay after the last signal present on the line;

a candidature message is transmitted from any transmitter candidate module having a meaningful message to transmit and for which said first order number is higher than that of the module which has just transmitted, at the end of a time-delay corresponding to said higher order candidature time-delay after the last signal present on the line;

the counter of each said module is incremented after each meaningful message and after each candidature message transmitted after a higher order candidature time-delay;

a candidature message is transmitted from any transmitter candidates of lower order than that which has just transmitted after a lower order candidature time-delay from the last signal present on the line; and the counter of each module is reinitialized after a candidature message transmitted after a lower order candidature time-delay, so that the module with the lowest order number is authorized to send a meaningful message.

2. The method according to claim 1, wherein a fourth time-delay is defined as a reception-acknowledgement time-delay to have a duration shorter than the meaningful message time-delay, and transmission of a reception acknowledgement message (SOK, ROK) is transmitted by the module to which the last meaningful message is addressed, at the end of a time-delay corresponding to said reception acknowledgement time-delay.

3. The method according to claim 2, said modules being communicator modules (COM), said network further including satellite modules (SAT) connected to said transmission line, and said time-delays being primary time-delays, and each said satellite module being associated with a respective one of said communicator modules (COM) a respective second order number, wherein:

transmissions from respective ones of said satellite modules (SAT) associated with a respective communicator module (COM) are sequenced by means of a respective secondary meaningful message time-delay and a secondary higher order candidature time-delays; and transmissions from said modules (COM, SAT) are sequenced by means of said primary and secondary time-delays, the primary time-delays being of longer duration than the secondary time-delays.

4. The method according to claim 3, comprising defining a first intermediate time-delay having a duration between those of the primary and secondary time-delays, so that any satellite module (SAT) that is a transmitter candidate, and that is associated with the communicator module (COM) authorized to transmit, transmits a higher order candidate message (SXM); and defining an end of cycle time-delay and a second intermediate time-delay having a duration between that of the higher order candidature primary time-delay and said end of cycle time-delay, so that any of said satellite modules (SAT), that are transmitter candidates and that are associated with a communicator of higher order than that authorized to transmit, transmits a higher order candidature message (SXM).

5. The method according to claim 4, comprising defining a control time-delay having a duration between the second intermediate time-delay and the end of cycle time-delay, in which any of said satellite modules (SATn,m) not having had a message addressed to them from their associated communicator module (COMm) for a predetermined time transmit.

6. The method according to claim 1, wherein any of the modules which is a transmitter candidate module transmits in a range of duration determined by adding to the respective time-delay preceding the meaningful message a random value between predetermined limits.

7. The method according to claim 6, comprising:

defining a double-numbering secondary time-delay having a duration between the reception acknowledgement time-delay and the meaningful message secondary time-delay, so that when more than one of said satellite modules (SATn, m) associated with the same communicator (COMm) have the same first order number n, a first of them transmits after said secondary meaningful message time-delay while each other one thereof transmits after said double-numbering secondary time-delay; and defining a double-numbering primary time-delay having a duration between the higher order candidate secondary time-delay and the meaningful message primary time-delay, so that when more than one of said communicator modules (COMm) have the same first order number m, the first of these transmits a meaningful message after said meaningful message primary time-delay while each other one thereof transmits after said double numbering primary time-delay.

8. The method according to claim 1, wherein each said time-delay is made up by juxtaposing a respective predetermined number of an elementary time-delay.

9. A digital data communication network employing the method according to claim 1.

10. The network according to claim 9, said first order number being indicated by m, said modules comprising communicator modules (COMm) and satellite modules (SATn,m), each said satellite module being associated with a respective one of said communicator modules by a second order number n.

11. The network according to claim 9, each said module comprising a line coding-decoding unit (CODL) including means for decoding data (DCOD) in said meaningful messages that are received, for calculating times (CALT), for coding data (CODD), for said meaningful messages to be transmitted, and for measuring time intervals of silence between said messages (CSIL).

12. The network according to claim 9, in which each said message is composed, at least in part, of active pulses modulating a carrier, so as to form active signals (SA), said network comprising:

means (DT) for eliminating signals of duration less than a predetermined duration (T) occurring during a time interval ($t_2$) between the active signals (SA);

means for generating said active signals (SA) of duration significantly greater than said predetermined duration (T); and means adapted to encode logic states (CODD) by varying the time interval ($t_2$) between active signals (SA).

13. The network according to claim 12, each said module comprising means (CODD) adapted to measure the time elapsed between the trailing edges of demodulated signals (MRE), for determining each of said primary and secondary time-delays.

14. The network according to claim 11, comprising a network for domestic electrical power distribution.

* * * * *